(12) United States Patent
Shanmugam et al.

(10) Patent No.: US 11,827,732 B2
(45) Date of Patent: *Nov. 28, 2023

(54) AMPHIPHILIC BRANCHED COPOLYMER DRILLING ADDITIVE

(71) Applicant: Saudi Arabian Oil Company, Dhahran (SA)

(72) Inventors: Sivaprakash Shanmugam, Houston, TX (US); Ashok Santra, Houston, TX (US); Carl Thaemlitz, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/592,053

(22) Filed: Feb. 3, 2022

(65) Prior Publication Data

US 2022/0242993 A1    Aug. 4, 2022

Related U.S. Application Data

(60) Provisional application No. 63/145,568, filed on Feb. 4, 2021, provisional application No. 63/145,565, filed on Feb. 4, 2021, provisional application No. 63/145,570, filed on Feb. 4, 2021.

(51) Int. Cl.
*C08F 293/00* (2006.01)
*C09K 8/34* (2006.01)

(52) U.S. Cl.
CPC .............. *C08F 293/00* (2013.01); *C09K 8/34* (2013.01)

(58) Field of Classification Search
CPC .............. C08F 222/385; C08F 220/06; C08F 220/1812; C08F 220/56; C08F 220/54
See application file for complete search history.

(56) References Cited

U.S. PATENT DOCUMENTS

| 6,715,568 | B1 | 4/2004 | Bailey |
| 10,280,101 | B2 | 5/2019 | Miller et al. |
| 2004/0219215 | A1 | 11/2004 | Bavouzet et al. |
| 2008/0114128 | A1* | 5/2008 | Destarac ............ C08F 293/005 525/193 |

(Continued)

FOREIGN PATENT DOCUMENTS

| CA | 2980510 A1 | 10/2016 |
| WO | 0078891 A1 | 12/2000 |

(Continued)

OTHER PUBLICATIONS

Carvente et al. Journal of Polymer Research (2002) 27:200 (Year: 2002).*

(Continued)

*Primary Examiner* — Mark S Kaucher
(74) *Attorney, Agent, or Firm* — DINSMORE & SHOHL LLP

(57) ABSTRACT

An amphiphilic branched star polymer drilling additive includes a crosslinked, polymerized reaction product of crosslinker C, hydrophobic monomer B, and hydrophilic monomer A. The crosslinked polymerized reaction product includes a plurality of block copolymer segments of hydrophobic monomer B and hydrophilic monomer A interconnected via crosslinker C.

8 Claims, 4 Drawing Sheets

(56) References Cited

U.S. PATENT DOCUMENTS

| | | | | |
|---|---|---|---|---|
| 2010/0120637 | A1* | 5/2010 | Bendejacq | C09K 8/68 |
| | | | | 525/451 |
| 2017/0051196 | A1 | 2/2017 | Galindo et al. | |
| 2018/0230355 | A1* | 8/2018 | Zha | C09K 8/516 |
| 2019/0185740 | A1 | 6/2019 | Jung et al. | |
| 2019/0194397 | A1* | 6/2019 | Jakubowski | A61K 8/8152 |
| 2022/0242786 | A1* | 8/2022 | Shanmugam | C04B 28/02 |
| 2022/0243113 | A1* | 8/2022 | Shanmugam | C09K 8/516 |
| 2022/0243114 | A1* | 8/2022 | Shanmugam | C09K 8/32 |

FOREIGN PATENT DOCUMENTS

| | | |
|---|---|---|
| WO | 2014036498 A2 | 3/2014 |
| WO | 2015049378 A1 | 4/2015 |
| WO | 2017048234 A1 | 3/2017 |

OTHER PUBLICATIONS

Yuan et al. Huaxue Gongye Yu Gongcheng Jishu vol. 31 Issue: 6 pp. 26-30 (Year: 2010).*

Tiemeyer et al. Journal of Applied Polymer Science 2013, 851-8560 (Year: 2013).*

Notification of Transmittal of the International Search Report and the Written Opinion of the International Searching Authority, or the Declaration dated May 10, 2022 pertaining to International application No. PCT/US2022/015091 filed Feb. 3, 2022, pp. 1-13.

Cadix et al., "Diblock Copolymers: A New Class of Fluid Loss Control Additive for Oilfield Cementing", Society of Petroleum Engineers, SPE-173758-MX, 2015.

Cadix et al., "High Temperature Cementing: Fluid Loss Control Polymers Performance and Limitations", Society of Petroleum Engineers, SPE-183129-MS, 2016.

Cadix et al., "Short Term Gas Migration Control in Well Cementing: Comparative Behavior of Fluid Loss Control Polymers", Society of Petroleum Engineers, SPE-184564-MS, 2017.

Goh et al., "Rheology of core cross-linked star polymers", Polymer, vol. 49, pp. 5095-5104, 2008.

Jouenne, "Polymer flooding in high temperature, high salinity conditions: Selection of polymer type and polymer chemistry, thermal stability", Journal of Petroleum Science and Engineering, vol. 195, 107545, 2020.

Liu et al., "Synthesis and characterization of comb-shaped copolymer as a filtration reducer and comparison with counterparts", Royal Society of Chemistry, RSC Advances, vol. 8, pp. 11424-11435, 2018.

Zhao et al., "Synthesis and evaluation of a novel clean hydraulic fracturing fluid based on star-dendritic polymer", Journal of Natural Gas Science and Engineering, Journal of Natural Gas Science and Engineering, vol. 43, pp. 179-189, 2017.

U.S. Office Action dated Feb. 15, 2023 pertaining to U.S. Appl. No. 17/592,058, filed Feb. 3, 2022, 18 pages.

* cited by examiner

AMPHIPHILIC BRANCHED COPOLYMER DRILLING ADDITIVE

CROSS-REFERENCE TO RELATED APPLICATION

This application claims priority to U.S. Provisional Application No. 63/145,570, filed Feb. 4, 2021, U.S. Provisional Application No. 63/145,565, filed on Feb. 4, 2021, and U.S. Provisional Application No. 63/145,568, filed on Feb. 4, 2021, the entirety of which is incorporated herein by reference.

TECHNICAL FIELD

Embodiments of the disclosure generally relate to drilling fluids and methods of making drilling fluids.

BACKGROUND

Drilling fluids in the oil and gas industries perform a myriad of tasks, including cleaning a well, holding cuttings in suspension, reducing friction, lubricating the drilling tools, maintaining stability of a wellbore, and preventing fluid loss, as non-limiting examples. A good drilling fluid should have satisfactory fluid loss value and be able to deposit a thin, low permeability filter cake on the wall of the borehole for consolidation of formation, and prevent fluid passage into the formation. Fluid loss from drilling muds into the formation takes place when the permeability of the wellbore allows passage of fluid between pore openings. Large initial pore sizes on the formation can lead to initial mud spurt. Build-up of filter cake on the wall of the wellbore takes place upon further loss of fluids into the formation. A filter cake is often composed of native solids found in the wellbore in combination with the solids content found in the drilling mud.

Improper filtration control during drilling operations can lead to several problems. Excessive filtration rates and thick filter cake build-up can lead to tight spots in the wellbore leading to excessive drag, pressure surges when pipes are moved due to a decrease in hole diameter, differential pressure sticking of the drill string due to an increased area of contact of pipe to thick filter cake, rapid build-up of sticking force in high permeability cake, primary cementing problems due to poor displacement of dehydrated mud, and excessive formation damage from mud filtrate. The extent of fluid loss depends on the porosity and permeability of the formation, and therefore, extensive fluid loss can be an expensive expenditure due to the high cost of fluids used in petroleum technology.

Fluid loss control additives, also known as filtrate-reducing agents, are part of a group of mud additives that are designed to lower the volume of filtrate that passes through a filter medium. Important considerations need to be given not only to the compositions of the solid content in the drilling fluid, but also particle size, shape and distribution. The most efficient method of controlling fluid loss is by controlling the permeability of the filter cake. Permeability of the filter cake can be manipulated by the size, shape, and deformability of particles under pressure. Small particles with colloidal sizes of less than 2 micron provide majority of fluid loss control. Nevertheless, optimum control is achieved by having particles with different sizes. The smaller particles are able to wedge between larger particles to form low-permeability filter cake.

SUMMARY

Drilling fluids may be subjected to fluid loss into the formation as formation permeability allows for passage of fluid into the formation. Therefore, a drilling fluid needs to be able to deposit a thin impermeable filter cake to reduce fluid loss and ensure high performance of the drilling fluid. Drilling fluids are often subjected to two types of filtration—dynamic filtration when the mud is circulating and static filtration when the mud is at rest. Dynamic filtration is different from static filtration as the flow of the mud in the former will lead to the erosion of filter cake as it is deposited by the filtration process. The filter cake builds up until the rate of erosion is equal rate of deposition. In static filtration, the filter cake tends to grow with time and rate of filtration continues to decrease. Accordingly, an improved approach to reducing or eliminating the loss of fluid is warranted. The drilling fluid described in this disclosure includes a fluid loss control additive that ensures minimum loss of fluid into the formation via dynamic filtration and prevents the formation of thick filter cakes via static filtration.

According to one embodiment, an amphiphilic branched star polymer comprises a crosslinked, polymerized reaction product of crosslinker C, hydrophobic monomer B, and hydrophilic monomer A, wherein the crosslinked polymerized reaction product comprises a plurality of block copolymer segments of hydrophobic monomer B and hydrophilic monomer A interconnected via crosslinker C.

According to another embodiment, a branched star polymer comprises a crosslinked, polymerized reaction product of crosslinker C and hydrophilic monomer A and hydrophilic monomer B and optionally hydrophilic monomer D, wherein the crosslinked polymerized reaction product comprises: a plurality of block copolymer segments of hydrophilic monomer A and hydrophilic monomer B interconnected via crosslinker C; a plurality of block copolymer segments of hydrophilic monomer A, hydrophilic monomer B, and hydrophilic monomer D interconnected via crosslinker C; or combinations thereof.

According to another embodiment, a hydrophobic branched star polymer comprises a crosslinked, polymerized reaction product of crosslinker C and hydrophobic monomer B, wherein the crosslinked polymerized reaction product comprises a plurality of block copolymer segments of hydrophobic monomer B interconnected via crosslinker C Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
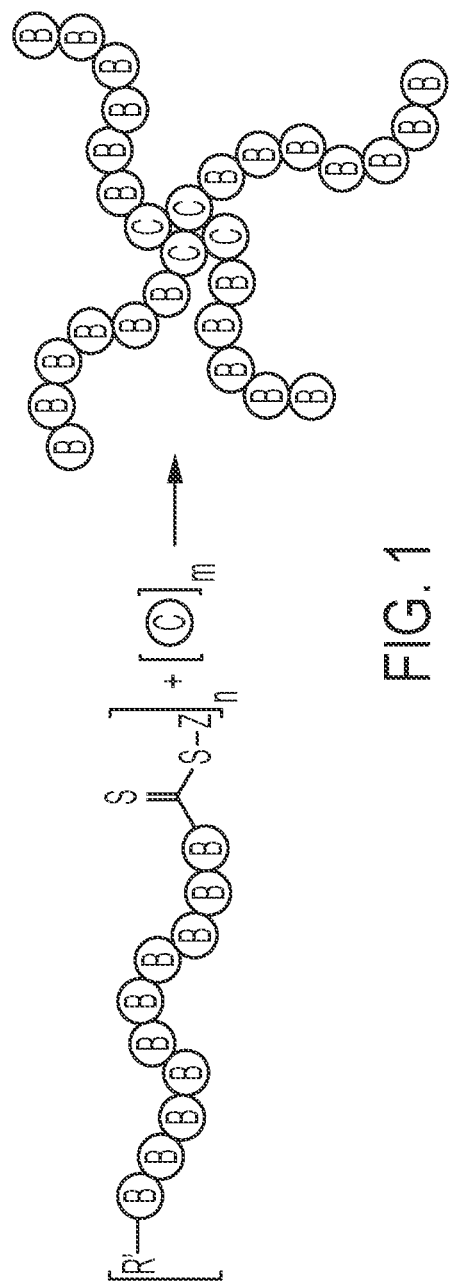
FIG. 1 schematically depicts the synthesis of a hydrophobic branched star polymer, according to one or more embodiments of this disclosure.

The drilling fluids of the present disclosure may be used in the oil and gas drilling industries, such as for drilling in oil and gas wells. Oil and gas wells may be formed in subterranean portions of the Earth, sometimes referred to as subterranean geological formations. The wellbore may serve to connect natural resources, such as petrochemical products, to a ground level surface. In some embodiments, a wellbore may be formed in the geological formation, such as by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, the drilling fluid, known as "drilling mud," may be utilized during the drilling process. To remove the rock cuttings from the bottom of the wellbore, drilling fluid is pumped down through the drill string to the drill bit. The drilling fluid may cool the drill bit and lift the rock cuttings away from the drill bit and may carry the rock cuttings upwards as the drilling fluid is recirculated back to the surface. The drilling fluid serves several functions in the drilling process. The drilling fluid may provide lubrication and may cool the drill bit. The drilling fluid may also transport rock cuttings from the drill bit to the surface, which may be referred to as "cleaning" the wellbore. Additionally, the drilling fluid may provide hydrostatic pressure in the wellbore to provide support to the sidewalls of the wellbore and prevent the sidewalls from collapsing and caving in on the drill string. The drilling fluid may also prevent fluids in the downhole formations from flowing into the wellbore during drilling operations.

To accomplish these functions, the drilling fluid may be formulated to have specific characteristics, such as density, viscosity, solids content, pump-ability and hole-cleaning capability. In particular, the drilling fluid may be formulated to have a density in a range suitable to provide the necessary hydrostatic pressure to support the sidewalls of the wellbore and prevent fluids in the formation from flowing into the wellbore. Additionally, the drilling fluids may be formulated to have specific rheological properties that allow the drilling fluid to be pumped down through the drill string while still capturing and conveying rock cuttings from the drill bit to the top of the wellbore. In some embodiments, the drilling fluids may include solid particles suspended in a base fluid. The solid particles, sometimes referred to as a weighting agent, may increase the density of the drilling fluid to help the drilling fluid support the sidewalls of the wellbore are well as increase the hydrostatic pressure to keep fluids from the formation from flowing into the wellbore. In embodiments, the drilling fluids may be able to provide the necessary hydrostatic pressure without the use of solid particles to increase the density of the fluid.

Embodiments of the present disclosure generally relate to drilling fluids including an aqueous phase, an oleaginous phase, or both; a clay-based component; and an amphiphilic or hydrophobic branched star polymer. As used throughout the disclosure, "aqueous phase" refers to a fluid containing, producing, resembling, or having the properties of water. Similarly, "oleaginous phase" refers to a fluid containing, producing, resembling, or having the properties of oil. It should be understood that the terms "oil-based drilling fluid" or "emulsified drilling fluid" refer to a drilling fluid including both an aqueous phase and an oleaginous phase.

As stated, the aqueous phase may be any suitable fluid containing, producing, resembling, or having the properties of water. The aqueous phase may include fresh water, salt water, brine, municipal water, formation water, produced water, well water, filtered water, distilled water, sea water, or combinations thereof. The aqueous phase in some embodiments may use water containing organic compounds or salt. Without being bound by any particular theory, salt or organic compounds may be incorporated into the aqueous phase to control the density of the emulsified drilling fluid. Increasing the saturation of the aqueous phase by increasing the salt concentration or the level of organic compounds in the aqueous phase may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides or combinations of these. In some particular embodiments, brine may be used in the aqueous phase. Without being bound by any particular theory, brine may be used to create osmotic balance between the drilling fluid and the subsurface formation.

In some embodiments, the drilling fluid may contain from 5 weight percent (wt. %) to 95 wt. % of the aqueous phase based on the total weight of the drilling fluid. In some embodiments, the drilling fluid may contain from 5 wt. % to 90 wt. %, from 5 wt. % to 80 wt. %, from 5 wt. % to 70 wt. %, from 5 wt. % to 60 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 95 wt. %, from 10 wt. % to 90 wt. %, from 10 wt. % to 80 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 95 wt. %, from 20 wt. % to 90 wt. %, from 20 wt. % to 80 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 95 wt. %, from 30 wt. % to 90 wt. %, from 30 wt. % to 80 wt. %, from 30 wt. % to 70 wt. %, from 30 wt. % to 60 wt. %, from 30 wt. % to 50 wt. %, from 30 wt. % to 40 wt. %, from 40 wt. % to 95 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 95 wt. %, from 50 wt. % to 90 wt. %, from 50 wt. % to 80 wt. %, from 50 wt. % to 70 wt. %, from 50 wt. % to 60 wt. %, from 60 wt. % to 95 wt. %, from 60 wt. % to 90 wt. %, from 60 wt. % to 80 wt. %, from 60 wt. % to 70 wt. %, from 70 wt. % to 95 wt. %, from 70 wt. % to 90 wt. %, from 70 wt. % to 80 wt. %, from 80 wt. % to 95 wt. %, from 80 wt. % to 90 wt. %, or from 90 wt. % to 95 wt. % of the aqueous phase based on the total weight of the drilling fluid. In embodiments where the drilling fluid contains from 50 wt. % to 95 wt. %, from 50 wt. % to 90 wt. %, from 50 wt. % to 80 wt. %, from 50 wt. % to 70 wt. %, from 50 wt. % to 60 wt. %, from 60 wt. % to 95 wt. %, from 60 wt. % to 90 wt. %, from 60 wt. % to 80 wt. %, from 60 wt. % to 70 wt. %, from 70 wt. % to 95 wt. %, from 70 wt. % to 90 wt. %, from 70 wt. % to 80 wt. %, from 80 wt. % to 95 wt. %, from 80 wt. % to 90 wt. %, or from 90 wt. % to 95 wt. % of the aqueous phase based on the total weight of the drilling fluid, the drilling fluid may include a water based drilling fluid that does not contain barite or any other weighting agent or an unweighted invert emulsion drilling fluid that does not contain barite or any other weighting agent.

In embodiments, the drilling fluid may include an oleaginous phase. As stated, the oleaginous phase refers to a fluid containing, producing, resembling, or having the properties of oil. The oleaginous phase may be oil, such as natural or synthetic liquid oil. The oleaginous phase may be or may contain diesel oil, mineral oil, hydrogenated or unhydrogenated olefins such as poly-alpha olefins, linear and branched olefins, poly-diorganosiloxanes, siloxanes, organosiloxanes, esters of fatty acids, straight chain, branched or cyclical alkyl ethers of fatty acids, or combinations of any of these. The oleaginous phase may contain esters, ethers, acetals, dialkylcarbonates, hydrocarbons or combinations of any of these. In some embodiments, the oleaginous phase may contain or may be oils derived from petroleum, such as mineral oils, diesel oils, linear olefins, paraffin, or combinations of these oils or oils derived from plants, such as safra oil.

The drilling fluid may contain from 1 to 70 wt. % of the oleaginous phase based on the total weight of the drilling fluid. The drilling fluid may contain from 1 wt. % to 60 wt. %, from 1 wt. % to 50 wt. %, from 1 wt. % to 40 wt. %, from 1 wt. % to 30 wt. %, from 1 wt. % to 25 wt. %, from 1 wt. % to 20 wt. %, from 1 wt. % to 15 wt. %, from 1 wt. % to 10 wt. %, from 1 wt. % to 8 wt. %, from 1 wt. % to 5 wt %, from 1 wt. % to 3 wt. %, from 3 wt. % to 70 wt. %, from 3 wt. % to 60 wt. %, from 3 wt. % to 50 wt. %, from 3 wt. % to 40 wt. %, from 3 wt. % to 30 wt. %, from 3 wt. % to 25 wt. %, from 3 wt. % to 20 wt. %, from 3 wt. % to 15 wt. %, from 3 wt. % to 10 wt. %, from 3 wt. % to 8 wt. %, from 3 wt. % to 5 wt %, from 5 wt. % to 70 wt. %, from 5 wt. % to 60 wt. %, from 5 wt. % to 50 wt. %, from 5 wt. % to 40 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 5 wt. % to 8 wt. %, from 8 wt. % to 70 wt. %, from 8 wt. % to 60 wt. %, from 8 wt. % to 50 wt. %, from 8 wt. % to 40 wt. %, from 8 wt. % to 30 wt. %, from 8 wt. % to 25 wt. %, from 8 wt. % to 20 wt. %, from 8 wt. % to 15 wt. %, from 8 wt. % to 10 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 25 wt. %, from 10 wt. % to 20 wt. %, from 10 wt. % to 15 wt. %, from 15 wt. % to 70 wt. %, from 15 wt. % to 60 wt. %, from 15 wt. % to 50 wt. %, from 15 wt. % to 40 wt. %, from 15 wt. % to 30 wt. %, from 15 wt. % to 25 wt. %, from 15 wt. % to 20 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 20 wt. % to 25 wt. %, from 25 wt. % to 70 wt. %, from 25 wt. % to 60 wt. %, from 25 wt. % to 50 wt. %, from 25 wt. % to 40 wt. %, from 25 wt. % to 30 wt. %, from 30 wt. % to 70 wt. %, from 30 wt. % to 60 wt. %, from 30 wt. % to 50 wt. %, from 30 wt. % to 40 wt. %, from 40 wt. % to 70 wt. %, from 40 wt. % to 60 wt. %, from 40 wt. % to 50 wt. %, from 50 wt. % to 70 wt. %, from 50 wt. % to 60 wt. %, or from 60 wt. % to 70 wt. % of the oleaginous phase based on the total weight of the drilling fluid. In embodiments where the drilling fluid contains greater than 20 wt. % oleaginous phase based on the total weight of the drilling fluid, the drilling fluid may include an unweighted invert emulsion drilling fluid that does not contain barite or any other weighting agent.

In embodiments, the drilling fluid may include from 0.1 to 2.0 wt. %, from 0.1 to 1.5 wt. %, from 0.1 to 1.0 wt. %, from 0.1 to 0.8 wt. %, from 0.1 to 0.5 wt. %, from 0.1 to 0.3 wt. %, from 0.3 to 2.0 wt. %, from 0.3 to 1.5 wt. %, from 0.3 to 1.0 wt. %, from 0.3 to 0.8 wt. %, from 0.3 to 0.5 wt. %, from 0.5 to 2.0 wt. %, from 0.5 to 1.5 wt. %, from 0.5 to 1.0 wt. %, from 0.5 to 0.8 wt. %, from 0.8 to 2.0 wt. %, from 0.8 to 1.5 wt. %, from 0.8 to 1.0 wt. %, from 1.0 to 2.0 wt. %, from 1.0 to 1.5 wt. %, or from 1.5 to 2.0 wt. % safra oil based on the total weight of the drilling fluid.

The drilling fluid also includes a clay-based component. The clay-based component may include lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin ($Al_2Si_2O_5(OH)_4$ or kaolinite), alumina ($Al_2O_3$, or aluminum oxide), silicon carbide, tungsten carbide, or combinations thereof. In some embodiments, the clay-based component may be bentonite. Without being bound by any particular theory, use of a clay-based component may increase the viscosity and rheology of the drilling fluid as compared to a drilling fluid without a clay-based component to allow for better drill lubrication, shear strength, and transportation of cuttings.

The drilling fluid may contain from 0.01 wt. % to 80 wt. % of the clay-based component based on the total weight of the drilling fluid. The drilling fluid may contain from 28 to 720 lb/bbl of the clay-based component based on the total weight of the drilling fluid. In some embodiments, the drilling fluid may contain from 28 to 700 lb/bbl, or 50 to 700 lb/bbl, or 100 to 700 lb/bbl, or 200 to 500 lb/bbl of the clay-based component.

The drilling fluid may also include an amphiphilic branched star polymer. The amphiphilic branched star polymer is crosslinked, and may include the polymerized reaction product of crosslinker C and hydrophobic monomer B. In embodiments, the amphiphilic branched star polymer may optionally include hydrophilic monomer A. The monomers A and B have the structure:

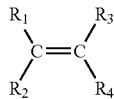

where $R_1$ and $R_2$ may include a halogen, H, CN, $CF_3$, straight or branched alkyl of from 1 to 20 carbon atoms, $\alpha,\beta$-unsaturated straight or branched alkenyl or alkynyl of 2 to 10 carbon atoms, $\alpha,\beta$-unsaturated straight or branched alkenyl of 2 to 6 carbon atoms substituted with a halogen, $C_3$-$C_8$ cycloalkyl, heterocyclyl C(=Y)$R_5$, C(=Y)$NR_6R_7$ and YC(=Y)$R_8$; where Y may be $NR_8$ or O; $R_5$ is alkyl of from 1 to 20 carbon atoms, alkoxy of from 1 to 20 carbon atoms, aryloxy or heterocyclyloxy; $R_6$ and $R_7$ are independently H or alkyl of from 1 to 20 carbon atoms, or $R_6$ and $R_7$ may be joined together to form an alkylene group of from 2 to 5 carbon atoms, thus forming a 3- to 6-membered ring; and $R_8$ is H, straight or branched $C_1$-$C_{20}$ alkyl or aryl; and $R_3$ and $R_4$ are independently selected from the group consisting of a halogen, H, $C_1$-$C_6$ alkyl and COOR$_9$, where $R_9$ is an alkali metal, H, or a $C_1$-$C_6$ alkyl group; or $R_1$ and $R_3$ may be joined to form a group of the formula $(CH_2)_n$, may be substituted with from 1 to 2n halogen atoms or $C_1$-$C_4$ alkyl groups, and Y is as defined above; and at least two of $R_1$, $R_2$, $R^3$, and $R_4$ are a halogen or H.

The amphiphilic branched star polymer may include both hydrophilic and hydrophobic components to maintain hydrophilic-lipophilic balance (HLB) from 0.5 to 5.0, from 0.5 to 4.5, from 0.5 to 4.0, from 0.5 to 3.5, from 0.5 to 3.0, from 0.5 to 2.5, from 0.5 to 2.0, from 0.5 to 1.5, from 0.5 to 1.0, from 1.0 to 5.0, from 1.0 to 4.5, from 1.0 to 4.0, from 1.0 to 3.5, from 1.0 to 3.0, from 1.0 to 2.5, from 1.0 to 2.0, from 1.0 to 1.5, from 1.5 to 5.0, from 1.5 to 4.5, from 1.5 to 4.0, from 1.5 to 3.5, from 1.5 to 3.0, from 1.5 to 2.5, from 1.5 to 2.0, from 2.0 to 5.0, from 2.0 to 4.5, from 2.0 to 4.0, from 2.0 to 3.5, from 2.0 to 3.0, from 2.0 to 2.5, from 2.5 to 5.0, from 2.5 to 4.5, from 2.5 to 4.0, from 2.5 to 3.5, from 2.5 to 3.0, from 3.0 to 5.0, from 3.0 to 4.5, from 3.0 to 4.0, from 3.0 to 3.5, from 3.5 to 5.0, from 3.5 to 4.5, from 3.5 to 4.0, from 4.0 to 5.0, from 4.0 to 4.5, or from 4.5 to 5.0. Without intending to be bound by theory, in an oil-based drilling fluid, the hydrophilic components of the amphiphilic branched star polymer may associate with the aqueous phase in the oil-based drilling fluid, while the hydrophobic components associate with the oleaginous phase. It may be beneficial for the HLB of the amphiphilic branched star polymer to be relatively low (such as from 0.5 to 5.0) to accommodate a drilling fluid having from 70 vol. % to 90 vol. %, from 70 vol. % to 85 vol. %, from 70 vol. % to 80 vol. %, from 70 vol. % to 75 vol. %, from 75 vol. % to 90 vol. %, from 75 vol. % to 85 vol. %, from 75 vol. % to 80 vol. %, from 80 vol. % to 90 vol. %, from 80 vol. % to 85 vol. %, or from 85 vol. % to 90 vol. % oleaginous phase and from 10 vol. % to 30 vol. %, from 10 vol. % to 25 vol. %, from 10 vol. % to 20 vol. %, from 10 vol. % to 15 vol. %, from 15 vol. % to 30 vol. %, from 15 vol. % to 25 vol. %, from 15 vol. % to 20 vol. %, from 20 vol. % to 30 vol. %, from 20 vol. % to 25 vol. %, or from 25 vol. % to 30 vol. % aqueous phase by volume of the drilling fluid.

A hydrophobic branched star polymer may include the hydrophobic components described in this disclosure. The hydrophobic branched star polymer may have a HLB of approximately 0 as there is no hydrophilic block present. In embodiments, the hydrophobic branched star polymer includes a diblock copolymer of poly(lauryl acrylate)-block-poly(methylene bisacrylamide). The hydrophobic branched star polymer may include from 20 to 50 units of a hydrophobic component as described in this disclosure. As a nonlimiting example, 25 units (6009.5 g/mol) of lauryl acrylate may be used along with 10 units (1541.7 g/mol) of methylene bisacrylamide. The RAFT agent used to form the hydrophobic branched star polymer may have a molecular weight of from 200 g/mol to 250 g/mol, from 200 g/mol to 240 g/mol, from 200 g/mol to 235 g/mol, from 200 g/mol to 230 g/mol, from 200 g/mol to 220 g/mol, from 200 g/mol to 210 g/mol, from 210 g/mol to 250 g/mol, from 210 g/mol to 240 g/mol, from 210 g/mol to 235 g/mol, from 210 g/mol to 230 g/mol, from 210 g/mol to 220 g/mol, from 220 g/mol to 250 g/mol, from 220 g/mol to 240 g/mol, from 220 g/mol to 235 g/mol, from 220 g/mol to 230 g/mol, from 230 g/mol to 250 g/mol, from 230 g/mol to 240 g/mol, from 230 g/mol to 235 g/mol, or of approximately 238.39 g/mol. The hydrophobic star polymer may disperse only in the oleaginous phase and may not interact with the aqueous phase.

In embodiments, a hydrophilic branched star polymer may include the hydrophilic components described in this disclosure. The hydrophilic branched star polymer may have a HLB of greater than 10, greater than 11, greater than 12, greater than 13, greater than 14, greater than 15, greater than 16, or greater than 17. The hydrophilic branched star polymer may have a HLB from 11 to 18, from 11 to 17, from 11 to 16, from 11 to 15, from 11 to 14, from 11 to 13, from 11 to 12.5, from 11 to 12, from 11 to 11.5, from 11.5 to 18, from 11.5 to 17, from 11.5 to 16, from 11.5 to 15, from 11.5 to 14, from 11.5 to 13, from 11.5 to 12.5, from 11.5 to 12, from 12 to 18, from 12 to 17, from 12 to 16, from 12 to 15, from 12 to 14, from 12 to 13, from 12 to 12.5, from 12.5 to 18, from 12.5 to 17, from 12.5 to 16, from 12.5 to 15, from 12.5 to 14, from 12.5 to 13, from 13 to 18, from 13 to 17, from 13 to 16, from 13 to 15, from 13 to 14, from 14 to 18, from 14 to 17, from 14 to 16, from 14 to 15, from 15 to 18, from 15 to 17, from 15 to 16, from 16 to 18, from 16 to 17, from 17 to 18, approximately 12, or approximately 12.2. The hydrophilic branched star polymer may be beneficial for use in a water-based drilling fluid. The hydrophilic branched star polymer may include hydrophilic and hydrophobic units. In embodiments, the hydrophilic branched star polymer may have an increased length of the acrylic acid units or a reduced length of the hydrophobic units as compared to the amphiphilic or hydrophobic branched star polymers. The increased length of the acrylic acid units, the reduced length of the hydrophobic units, or both, may cause the HLB of the hydrophilic branched star polymer to be any of the HLBs previously described. In water-based drilling fluids, upon dispersing in aqueous solutions, the hydrophobic moieties may tend to minimize surface contact with water and associate in the form of microaggregates. When the hydrophobic moieties are short alkyl chains, these associations may behave similar to surfactant micelles. In a water-based drilling fluid, there is a high tendency for the hydrophobic components to associate with one another to avoid contact with water while the hydrophilic component faces the aqueous environment. In embodiments, the hydrophilic block (which may include polyacrylic acid, or any previously described monomer A) will likely be facing the aqueous environment and the hydrophobic component (which may include poly(lauryl acrylate)-block-poly(methylene bisacrylamide), or any previously described monomer B and crosslinker C) may associate with one another to avoid the aqueous environment.

As used in this disclosure, the HLB of the compound is the measure of the degree to which it is hydrophilic or lipophilic, which may be determined by the Griffin Method calculation, as shown in Equation 1:

$$HLB = 20 \times \frac{M_h}{M} \qquad \text{Equation 1}$$

in which $M_h$ is the molecular mass of the hydrophilic portion of the molecule and M is the molecular mass of the entire molecule. The resulting HLB value provides a result on a scale of from 0 to 20 in which a value of 0 indicates to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble).

Without intending to be bound by theory, when the hydrophilic component is present, the hydrophilic component may anchor onto the clay-based component thereby stabilizing the aqueous-phase within the drilling fluid. In addition, the hydrophobic component may provide dense hydrophobic alkyl chains at an interfacial region between the aqueous phase and the oleaginous phase thereby forming a high viscosity zones thereby resulting in better sealing and reduce filtration loss.

Without intending to be bound by theory, when the hydrophilic component is present, the hydrophilic monomer will be attracted to the aqueous phase of the drilling fluid thereby forming core-shell latex particles. Similarly, the hydrophobic monomer will internalize to form a hydrophobic environment, thereby resulting in the formation of micellar latex particles. The core-shell latex particles may provide an additional benefit as an interfacial stabilizer of oil droplets in an emulsion. The block copolymer nature of the branched star polymer allows the hydrophilic region (i.e. monomer A) to face the aqueous environment while the hydrophobic region (i.e. monomer B) will internalize within the oil droplet. Consequently, the branched block star polymer may behave like a surfactant that stabilizes the oil droplet in water. Since the drilling fluid described here is an invert emulsion, the hydrophilic block of the branched star polymer can interact with water droplets and shield the droplets from the hydrophobic environment by having the hydrophobic region of the branched star polymer facing the oil environment.

The amphiphilic/hydrophilic branched star polymer may be a crosslinked, polymerized reaction product of crosslinker C and hydrophilic monomer A and hydrophilic/hydrophobic monomer B. In embodiments, the amphiphilic/hydrophilic branched star polymer may optionally include hydrophilic/hydrophobic monomer D.

Monomer A may include acrylic acid (AA), 2-acrylamido-2-methylpropane sulfonic acid (AMPS), 2-acrylamido ethyl phosphonic acid (AEPA), maleic acid, N,N-dimethylacrylamide, (3-acrylamidopropyl) trimethylammonium chloride, 2-hydroxyethyl acrylate, styrene-4-sulfonic acid sodium salt, poly(ethylene glycol) methyl ether acrylate, or combinations thereof. In embodiments, monomer A may include AMPS, AEPA, acrylic acid, maleic acid, or combinations thereof.

In embodiments, monomer A may include an anionic, hydrophilic monomer. Monomer A may include (meth)acrylate monomer units carrying a COOH or COO— group, including in particular acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid or monoethylenically unsaturated $C_4$-$C_{10}$ and preferably C4 to C6 dicarboxylic acid monoesters, such as monomethyl maleate. Monomer A may include ((meth)acrylate/(meth)acrylamide) monomer units carrying phosphate, phosphonate or phosphinate groups (in the free acid form and/or in the saline form), such as, 2-acrylamido-ethylphosphonic acid (AEPA), monoacryloyloxyethyl phosphate or bis(2-methacryloyloxyethyl) phosphate units, vinylphosphonic acid, allylphosphonic acid, isopropylphosphonic acid, diallyl aminomethylene phosphonate and their salts. Monomer A may include monomer units comprising a sulfonic acid or sulfonate functional group, including in particular the 3-sulfopropyl (meth)acrylate, 2-propene-1-sulfonic acid, sodium 1-allyloxy-2-hydroxypropylsulfonate (COPS1), in particular 2-acrylamido-2-methylpropanesulfonic acid (AMPS), (meth)allyl sulfonate, sodium vinylsulfonate, and sodium styrenesulfonate.

In embodiments, monomer A may include a nonionic, hydrophilic monomer. Monomer A may include an acrylamide monomer unit including N,N-(Dimethyl acrylamide) (DMA), (meth)acrylamide, or morpholine N-oxide acrylamide. Monomer A may include a diacetone acrylamide functional group such as N,N-dimethyl(meth)acrylamide, N,N-diethylacrylamide, (meth)acrylamide, N-isopropyl (meth)acrylamide, N-tert-butyl(meth)acrylamide, or diacetone acrylamide. Monomer A may include (meth)acrylate with ammonium groups, including N,N-dimethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate, meth(acrylamide) monomers with ammonium groups, including N-[2-(dimethylamino)ethyl](meth)acrylamide, N-[3-(dimethylamino) propyl](meth)acrylamide, N-[4-(dimethylamino)butyl](meth)acrylamide, N-[2(diethylamino)ethyl](meth)acrylamide, and N-[4-(dimethylamino)cyclohexyl](meth)acrylamide, [2-((Meth)acryloyloxy)ethyl] trimethylammonium chloride, and zwitterionic monomers such as N-(3-Sulfopropyl)-N-(meth)acroyloxyethyl-N,N-dimethylammonium betaine, N-(3-sulfopropyl)-N-methacroylamidepropyl-N,N-dimethylammonium betaine, N-(3-carboxymethyl)-N-methacroylamidepropyl-N,N-dimethylammonium betaine, or N-carboxymethyl-N-methacroyloxyethyl-N,N dimethylammonium betaine. Monomer A may include meth(acrylate) and meth(acrylamide) with alkane diols with $C_2$-$C_{30}$ or polyethylene glycol, such as 2-hydroxyethyl (meth)acrylate, 2-hydroxypropyl (meth)acrylate, 3-hydroxypropyl (meth)acrylate, 3-hydroxybutyl (meth)acrylate, 4-hydroxybutyl (meth)acrylate, 6-hydroxy hexyl(meth)acrylate, 3-hydroxy-2-ethylhexyl (meth)acrylate, N-(hydroxymethyl) acrylamide, N-(2-hydroxypropyl) methacrylamide, N-hydroxyethylacrylamide, N-[tris(hydroxymethyl)methyl]acrylamide, 4-acryloylmorpholine, 2-N-morpholinoethyl methacrylate, (meth)acrylate of polyethylene glycol, (meth)acrylate of diethylene glycol, ethylene glycol methyl ether (meth)acrylate, poly(propylene glycol) acrylate, 2chloroethyl(meth)acrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, or N-vinyl-7-ethyl-2-caprolactam.

In embodiments, monomer A may include acrylic acid. The amphiphilic branched star polymer for use in emulsified drilling fluids may not include monomer A. The amphiphilic branched star polymer for use in water-based drilling fluids includes monomer A. In embodiments where the amphiphilic branched star polymer is included in an emulsified drilling fluid and monomer A is included, the amphiphilic branched star polymer may include from 0.01 wt. % to 20 wt. %, from 0.01 wt. % to 18 wt. %, from 0.01 wt. % to 15 wt. %, from 0.01 wt. % to 12 wt. %, from 0.01 wt. % to 10 wt. %, from 0.01 wt. % to 8 wt. %, from 0.01 wt. % to 6 wt. %, from 0.01 wt. % to 4 wt. %, from 0.01 wt. % to 2 wt. %, from 0.01 wt. % to 1 wt. %, from 0.01 wt. % to 0.5 wt. %, from 0.01 wt. % to 0.1 wt. %, from 0.1 wt. % to 20 wt. %, from 0.1 wt. % to 18 wt. %, from 0.1 wt. % to 15 wt. %, from 0.1 wt. % to 12 wt. %, from 0.1 wt. % to 10 wt. %, from 0.1 wt. % to 8 wt. %, from 0.1 wt. % to 6 wt. %, from 0.1 wt. % to 4 wt. %, from 0.1 wt. % to 2 wt. %, from 0.1 wt. % to 1 wt. %, from 0.1 wt. % to 0.5 wt. %, from 0.5 wt. % to 20 wt. %, from 0.5 wt. % to 18 wt. %, from 0.5 wt. % to 15 wt. %, from 0.5 wt. % to 12 wt. %, from 0.5 wt. % to 10 wt. %, from 0.5 wt. % to 8 wt. %, from 0.5 wt. % to 6 wt. %, from 0.5 wt. % to 4 wt. %, from 0.5 wt. % to 2 wt. %, from 0.5 wt. % to 1 wt. %, from 1 wt. % to 20 wt. %, from 1 wt. % to 18 wt. %, from 1 wt. % to 15 wt. %, from 1 wt. % to 12 wt. %, from 1 wt. % to 10 wt. %, from 1 wt. % to 8 wt. %, from 1 wt. % to 6 wt. %, from 1 wt. % to 4 wt. %, from 1 wt. % to 2 wt. %, from 2 wt. % to 20 wt. %, from 2 wt. % to 18 wt. %, from 2 wt. % to 15 wt. %, from 2 wt. % to 12 wt. %, from 2 wt. % to 10 wt. %, from 2 wt. % to 8 wt. %, from 2 wt. % to 6 wt. %, from 2 wt. % to 4 wt. %, from 4 wt. % to 20 wt. %, from 4 wt. % to 18 wt. %, from 4 wt. % to 15 wt. %, from 4 wt. % to 12 wt. %, from 4 wt. % to 10 wt. %, from 4 wt. % to 8 wt. %, from 4 wt. % to 6 wt. %, from 6 wt. % to 20 wt. %, from 6 wt. % to 18 wt. %, from 6 wt. % to 15 wt. %, from 6 wt. % to 12 wt. %, from 6 wt. % to 10 wt. %, from 6 wt. % to 8 wt. %, from 8 wt. % to 20 wt. %, from 8 wt. % to 18 wt. %, from 8 wt. % to 15 wt. %, from 8 wt. % to 12 wt. %, from 8 wt. % to 10 wt. %, from 10 wt. % to 20 wt. %, from 10 wt. % to 18 wt. %, from 10 wt. % to 15 wt. %, from 10 wt. % to 12 wt. %, from 12 wt. % to 20 wt. %, from 12 wt. % to 18 wt. %, from 12 wt. % to 15 wt. %, from 15 wt. % to 20 wt. %, from 15 wt. % to 18 wt. %, or from 18 wt. % to 20 wt. % monomer A by weight of the amphiphilic branched star polymer. In embodiments where the amphiphilic branched star polymer is included in a water-based drilling fluid, the amphiphilic branched star polymer may include from 50 wt. % to 70 wt. %, from 50 wt. % to 65 wt. %, from 50 wt. % to 63 wt. %, from 50 wt. %, to 61 wt. %, from 50 wt. % to 60 wt. %, from 50 wt. % to 58 wt. %, from 50 wt. % to 55 wt. %, from 55 wt. % to 70 wt. %, from 55 wt. % to 65 wt. %, from 55 wt. % to 63 wt. %, from 55 wt. %, to 61 wt. %, from 55 wt. % to 60 wt. %, from 55 wt. % to 58 wt. %, from 58 wt. % to 70 wt. %, from 58 wt. % to 65 wt. %, from 58 wt. % to 63 wt. %, from 58 wt. %, to 61 wt. %, from 58 wt. % to 60 wt. %, from 60 wt. % to 70 wt. %, from 60 wt. % to 65 wt. %, from 60 wt. % to 63 wt. %, from 60 wt. %, to 61 wt. %, from 61 wt. % to 70 wt. %, from 61 wt. % to 65 wt. %, from 61 wt. % to 63 wt. %, from 63 wt. % to 70 wt. %, from 63 wt. % to 65 wt. %, from 65 wt. % to 70 wt. %, approximately 62 wt. %, or approximately 61.7 wt. % monomer A by weight of the amphiphilic branched star polymer.

Monomer B may include stearyl acrylate, lauryl acrylate, or combinations thereof. In embodiments, monomer B may include an alkyl acrylate having the structure shown below.

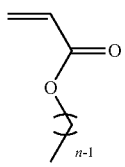

In embodiments, n may range from 5 to 20, from 5 to 17, from 5 to 15, from 5 to 14, from 5 to 12, from 5 to 10, from 5 to 8, from 5 to 7, from 7 to 20, from 7 to 17, from 7 to 15, from 7 to 14, from 7 to 12, from 7 to 10, from 7 to 8, from 8 to 20, from 8 to 17, from 8 to 15, from 8 to 14, from 8 to 12, from 8 to 10, from 10 to 20, from 10 to 17, from 10 to 15, from 10 to 14, from 10 to 12, from 12 to 20, from 12 to 17, from 12 to 15, from 12 to 14, from 14 to 20, from 14 to 17, from 15 to 20, from 15 to 17, or from 17 to 20.

In embodiments, monomer B may include lauryl acrylate. In embodiments where the amphiphilic branched star polymer is included in an emulsified drilling fluid, the amphiphilic branched star polymer may include from 60 wt. % to 99.99 wt. %, from 60 wt. % to 99.9 wt. %, from 60 wt. % to 99.5 wt. %, from 60 wt. % to 99 wt. %, from 60 wt. % to 98 wt. %, from 60 wt. % to 96 wt. %, from 60 wt. % to 94 wt. %, from 60 wt. % to 92 wt. %, from 60 wt. % to 90 wt. %, from 60 wt. % to 88 wt. %, from 60 wt. % to 86 wt. %, from 60 wt. % to 84 wt. %, from 60 wt. % to 82 wt. %, from 60 wt. % to 80 wt. %, from 60 wt. % to 75 wt. %, from 60 wt. % to 70 wt. %, from 60 wt. % to 65 wt. %, from 65 wt. % to 99.99 wt. %, from 65 wt. % to 99.9 wt. %, from 65 wt. % to 99.5 wt. %, from 65 wt. % to 99 wt. %, from 65 wt. % to 98 wt. %, from 65 wt. % to 96 wt. %, from 65 wt. % to 94 wt. %, from 65 wt. % to 92 wt. %, from 65 wt. % to 90 wt. %, from 65 wt. % to 88 wt. %, from 65 wt. % to 86 wt. %, from 65 wt. % to 84 wt. %, from 65 wt. % to 82 wt. %, from 65 wt. % to 80 wt. %, from 65 wt. % to 75 wt. %, from 65 wt. % to 70 wt. %, from 70 wt. % to 99.99 wt. %, from 70 wt. % to 99.9 wt. %, from 70 wt. % to 99.5 wt. %, from 70 wt. % to 99 wt. %, from 70 wt. % to 98 wt. %, from 70 wt. % to 96 wt. %, from 70 wt. % to 94 wt. %, from 70 wt. % to 92 wt. %, from 70 wt. % to 90 wt. %, from 70 wt. % to 88 wt. %, from 70 wt. % to 86 wt. %, from 70 wt. % to 84 wt. %, from 70 wt. % to 82 wt. %, from 70 wt. % to 80 wt. %, from 70 wt. % to 75 wt. %, from 75 wt. % to 99.99 wt. %, from 75 wt. % to 99.9 wt. %, from 75 wt. % to 99.5 wt. %, from 75 wt. % to 99 wt. %, from 75 wt. % to 98 wt. %, from 75 wt. % to 96 wt. %, from 75 wt. % to 94 wt. %, from 75 wt. % to 92 wt. %, from 75 wt. % to 90 wt. %, from 75 wt. % to 88 wt. %, from 75 wt. % to 86 wt. %, from 75 wt. % to 84 wt. %, from 75 wt. % to 82 wt. %, from 75 wt. % to 80 wt. %, from 75 wt. % to 75 wt. %, from 75 wt. % to 70 wt. %, from 80 wt. % to 99.99 wt. %, from 80 wt. % to 99.9 wt. %, from 80 wt. % to 99.5 wt. %, from 80 wt. % to 99 wt. %, from 80 wt. % to 98 wt. %, from 80 wt. % to 96 wt. %, from 80 wt. % to 94 wt. %, from 80 wt. % to 92 wt. %, from 80 wt. % to 90 wt. %, from 80 wt. % to 88 wt. %, from 80 wt. % to 86 wt. %, from 80 wt. % to 84 wt. %, from 80 wt. % to 82 wt. %, from 82 wt. % to 99.99 wt. %, from 82 wt. % to 99.9 wt. %, from 82 wt. % to 99.5 wt. %, from 82 wt. % to 99 wt. %, from 82 wt. % to 98 wt. %, from 82 wt. % to 96 wt. %, from 82 wt. % to 94 wt. %, from 82 wt. % to 92 wt. %, from 82 wt. % to 90 wt. %, from 82 wt. % to 88 wt. %, from 82 wt. % to 86 wt. %, from 82 wt. % to 84 wt. %, from 84 wt. % to 99.99 wt. %, from 84 wt. % to 99.9 wt. %, from 84 wt. % to 99.5 wt. %, from 84 wt. % to 99 wt. %, from 84 wt. % to 98 wt. %, from 84 wt. % to 96 wt. %, from 84 wt. % to 94 wt. %, from 84 wt. % to 92 wt. %, from 84 wt. % to 90 wt. %, from 84 wt. % to 88 wt. %, from 84 wt. % to 86 wt. %, from 86 wt. % to 99.99 wt. %, from 86 wt. % to 99.9 wt. %, from 86 wt. % to 99.5 wt. %, from 86 wt. % to 99 wt. %, from 86 wt. % to 98 wt. %, from 86 wt. % to 96 wt. %, from 86 wt. % to 94 wt. %, from 86 wt. % to 92 wt. %, from 86 wt. % to 90 wt. %, from 86 wt. % to 88 wt. %, from 88 wt. % to 99.99 wt. %, from 88 wt. % to 99.9 wt. %, from 88 wt. % to 99.5 wt. %, from 88 wt. % to 99 wt. %, from 88 wt. % to 98 wt. %, from 88 wt. % to 96 wt. %, from 88 wt. % to 94 wt. %, from 88 wt. % to 92 wt. %, from 88 wt. % to 90 wt. %, from 90 wt. % to 99.99 wt. %, from 90 wt. % to 99.9 wt. %, from 90 wt. % to 99.5 wt. %, from 90 wt. % to 99 wt. %, from 90 wt. % to 98 wt. %, from 90 wt. % to 96 wt. %, from 90 wt. % to 94 wt. %, from 90 wt. % to 92 wt. %, from 92 wt. % to 99.99 wt. %, from 92 wt. % to 99.9 wt. %, from 92 wt. % to 99.5 wt. %, from 92 wt. % to 99 wt. %, from 92 wt. % to 98 wt. %, from 92 wt. % to 96 wt. %, from 92 wt. % to 94 wt. %, from 94 wt. % to 99.99 wt. %, from 94 wt. % to 99.9 wt. %, from 94 wt. % to 99.5 wt. %, from 94 wt. % to 99 wt. %, from 94 wt. % to 98 wt. %, from 94 wt. % to 96 wt. %, from 96 wt. % to 99.99 wt. %, from 96 wt. % to 99.9 wt. %, from 96 wt. % to 99.5 wt. %, from 96 wt. % to 99 wt. %, from 96 wt. % to 98 wt. %, from 98 wt. % to 99.99 wt. %, from 98 wt. % to 99.9 wt. %, from 98 wt. % to 99.5 wt. %, from 98 wt. % to 99 wt. %, from 99 wt. % to 99.99 wt. %, from 99 wt. % to 99.9 wt. %, from 99 wt. % to 99.5 wt. %, from 99.5 wt. % to 99.99 wt. %, from 99.5 wt. % to 99.9 wt. %, or from 99.9 wt. % to 99.99 wt. % monomer B by weight of the amphiphilic branched star polymer. In embodiments where the amphiphilic branched star polymer is included in a water-based drilling fluid, the amphiphilic branched star polymer may include from 1 wt. % to 30 wt. %, from 1 wt. % to 27 wt. %, from 1 wt. % to 25 wt. %, from 1 wt. % to 24 wt. %, from 1 wt. % to 22 wt. %, from 1 wt. % to 20 wt. %, from 1 wt. % to 18 wt. %, from 1 wt. % to 15 wt. %, from 1 wt. % to 12 wt. %, from 1 wt. % to 10 wt. %, from 1 wt. % to 8 wt. %, from 1 wt. % to 6 wt. %, from 1 wt. % to 4 wt. %, from 1 wt. % to 2 wt. %, from 2 wt. % to 30 wt. %, from 2 wt. % to 27 wt. %, from 2 wt. % to 25 wt. %, from 2 wt. % to 24 wt. %, from 2 wt. % to 22 wt. %, from 2 wt. % to 20 wt. %, from 2 wt. % to 18 wt. %, from 2 wt. % to 15 wt. %, from 2 wt. % to 12 wt. %, from 2 wt. % to 10 wt. %, from 2 wt. % to 8 wt. %, from 2 wt. % to 6 wt. %, from 2 wt. % to 4 wt. %, from 4 wt. % to 30 wt. %, from 4 wt. % to 27 wt. %, from 4 wt. % to 25 wt. %, from 4 wt. % to 24 wt. %, from 4 wt. % to 22 wt. %, from 4 wt. % to 20 wt. %, from 4 wt. % to 18 wt. %, from 4 wt. % to 15 wt. %, from 4 wt. % to 12 wt. %, from 4 wt. % to 10 wt. %, from 4 wt. % to 8 wt. %, from 4 wt. % to 6 wt. %, from 6 wt. % to 30 wt. %, from 6 wt. % to 27 wt. %, from 6 wt. % to 25 wt. %, from 6 wt. % to 24 wt. %, from 6 wt. % to 22 wt. %, from 6 wt. % to 20 wt. %, from 6 wt. % to 18 wt. %, from 6 wt. % to 15 wt. %, from 6 wt. % to 12 wt. %, from 6 wt. % to 10 wt. %, from 6 wt. % to 8 wt. %, from 8 wt. % to 30 wt. %, from 8 wt. % to 27 wt. %, from 8 wt. % to 25 wt. %, from 8 wt. % to 24 wt. %, from 8 wt. % to 22 wt. %, from 8 wt. % to 20 wt. %, from 8 wt. % to 18 wt. %, from 8 wt. % to 15 wt. %, from 8 wt. % to 12 wt. %, from 8 wt. % to 10 wt. %, from 10 wt. % to 30 wt. %, from 10 wt. % to 27 wt. %, from 10 wt. % to 25 wt. %, from 10 wt. % to 24 wt. %, from 10 wt. % to 22 wt. %, from 10 wt. % to 20 wt. %, from 10 wt. % to 18 wt. %, from 10 wt. % to 15 wt. %, from 10 wt. % to 12 wt. %, from 12 wt. % to 30 wt. %, from 12 wt. % to 27 wt. %, from 12 wt. % to 25 wt. %, from 12 wt. % to 24 wt. %, from 12 wt. % to 22 wt. %, from 12 wt. % to 20 wt. %, from 12 wt. % to 18 wt. %, from 12 wt. % to 15 wt. %, from 15 wt. % to 30 wt. %, from 15 wt. % to 27 wt. %, from 15 wt. % to 25 wt. %, from 15 wt. % to 24 wt. %, from 15 wt. % to 22 wt. %, from 15 wt. % to 20 wt. %, from 15 wt. % to 18 wt. %, from 18 wt. % to 30 wt. %, from 18 wt. % to 27 wt. %, from 18 wt. % to 25 wt. %, from 18 wt. % to 24 wt. %, from 18 wt. % to 22 wt. %, from 18 wt. % to 20 wt. %, from 20 wt. % to 30 wt. %, from 20 wt. % to 27 wt. %, from 20 wt. % to 25 wt. %, from 20 wt. % to 24 wt. %, from 20 wt. % to 22 wt. %, from 22 wt. % to 30 wt. %, from 22 wt. % to 27 wt. %, from 22 wt. % to 25 wt. %, from 22 wt. % to 24 wt. %, from 24 wt. % to 30 wt. %, from 24 wt. % to 27 wt. %, from 24 wt. % to 25 wt. %, from 25 wt. % to 30 wt. %, from 25 wt. % to 27 wt. %, from 27 wt. % to 30 wt. %, approximately 23 wt. %, or approximately 23.3 wt. % monomer B by weight of the amphiphilic branched star polymer.

Monomer D may include any of the monomers described above for either Monomer A or Monomer B.

As stated previously, there are embodiments in which monomer D is not included. In embodiments where monomer D is included, the amphiphilic branched star polymer may include from 15 to 50 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % monomer D by weight of the amphiphilic branched star polymer.

The crosslinker C may include divinyl crosslinkers comprising vinyl aromatic, (meth)acrylate and (meth)acrylamide crosslinkers such as N,N-methylene bis(acrylamide), vinyl aromatic, N,N-methylenebisacrylamide, bis(2-methacryloyl)oxyethyl disulfide, 1,4-bis(4-vinylphenoxy)butane, divinyl benzene, ethylene glycol di(meth)acrylate, diethylene glycol di(meth)acrylate, tetra(ethylene glycol) diacrylate, triethylene glycol dimethacrylate, poly(ethylene glycol) di(meth)acrylate, neopentyl glycol diacrylate, neopentyl glycol propoxylate diacrylate, tri(propylene glycol) diacrylate, or combinations thereof. In embodiments, crosslinker C may include N,N-methylene bis(acrylamide). The amphiphilic branched star polymer may include from 0.01 wt. % to 35 wt. %, from 0.01 wt. % to 30 wt. %, from 0.01 wt. % to 25 wt. %, from 0.01 wt. % to 20 wt. %, from 0.01 wt. % to 18 wt. %, from 0.01 wt. % to 16 wt. %, from 0.01 wt. % to 14 wt. %, from 0.01 wt. % to 12 wt. %, from 0.01 wt. % to 10 wt. %, from 0.01 wt. % to 8 wt. %, from 0.01 wt. % to 6 wt. %, from 0.01 wt. % to 4 wt. %, from 0.01 wt. % to 2 wt. %, from 0.01 wt. % to 1 wt. %, from 0.01 wt. % to 0.5 wt. %, from 0.01 wt. % to 0.1 wt. %, from 0.1 wt. % to 35 wt. %, from 0.1 wt. % to 30 wt. %, from 0.1 wt. % to 25 wt. %, from 0.1 wt. % to 20 wt. %, from 0.1 wt. % to 18 wt. %, from 0.1 wt. % to 16 wt. %, from 0.1 wt. % to 14 wt. %, from 0.1 wt. % to 12 wt. %, from 0.1 wt. % to 10 wt. %, from 0.1 wt. % to 8 wt. %, from 0.1 wt. % to 6 wt. %, from 0.1 wt. % to 4 wt. %, from 0.1 wt. % to 2 wt. %, from 0.1 wt. % to 1 wt. %, from 0.1 wt. % to 0.5 wt. %, from 0.5 wt. % to 35 wt. %, from 0.5 wt. % to 30 wt. %, from 0.5 wt. % to 25 wt. %, from 0.5 wt. % to 20 wt. %, from 0.5 wt. % to 18 wt. %, from 0.5 wt. % to 16 wt. %, from 0.5 wt. % to 14 wt. %, from 0.5 wt. % to 12 wt. %, from 0.5 wt. % to 10 wt. %, from 0.5 wt. % to 8 wt. %, from 0.5 wt. % to 6 wt. %, from 0.5 wt. % to 4 wt. %, from 0.5 wt. % to 2 wt. %, from 0.5 wt. % to 1 wt. %, from 1 wt. % to 35 wt. %, from 1 wt. % to 30 wt. %, from 1 wt. % to 25 wt. %, from 1 wt. % to 20 wt. %, from 1 wt. % to 18 wt. %, from 1 wt. % to 16 wt. %, from 1 wt. % to 14 wt. %, from 1 wt. % to 12 wt. %, from 1 wt. % to 10 wt. %, from 1 wt. % to 8 wt. %, from 1 wt. % to 6 wt. %, from 1 wt. % to 4 wt. %, from 1 wt. % to 2 wt. %, from 2 wt. % to 35 wt. %, from 2 wt. % to 30 wt. %, from 2 wt. % to 25 wt. %, from 2 wt. % to 20 wt. %, from 2 wt. % to 18 wt. %, from 2 wt. % to 16 wt. %, from 2 wt. % to 14 wt. %, from 2 wt. % to 12 wt. %, from 2 wt. % to 10 wt. %, from 2 wt. % to 8 wt. %, from 2 wt. % to 6 wt. %, from 2 wt. % to 4 wt. %, from 4 wt. % to 35 wt. %, from 4 wt. % to 30 wt. %, from 4 wt. % to 25 wt. %, from 4 wt. % to 20 wt. %, from 4 wt. % to 18 wt. %, from 4 wt. % to 16 wt. %, from 4 wt. % to 14 wt. %, from 4 wt. % to 12 wt. %, from 4 wt. % to 10 wt. %, from 4 wt. % to 8 wt. %, from 4 wt. % to 6 wt. %, from 6 wt. % to 35 wt. %, from 6 wt. % to 30 wt. %, from 6 wt. % to 25 wt. %, from 6 wt. % to 20 wt. %, from 6 wt. % to 18 wt. %, from 6 wt. % to 16 wt. %, from 6 wt. % to 14 wt. %, from 6 wt. % to 12 wt. %, from 6 wt. % to 10 wt. %, from 6 wt. % to 8 wt. %, from 8 wt. % to 35 wt. %, from 8 wt. % to 30 wt. %, from 8 wt. % to 25 wt. %, from 8 wt. % to 20 wt. %, from 8 wt. % to 18 wt. %, from 8 wt. % to 16 wt. %, from 8 wt. % to 14 wt. %, from 8 wt. % to 12 wt. %, from 8 wt. % to 10 wt. %, from 10 wt. % to 35 wt. %, from 10 wt. % to 30 wt. %, from 10 wt. % to 25 wt. %, from 10 wt. % to 20 wt. %, from 10 wt. % to 18 wt. %, from 10 wt. % to 16 wt. %, from 10 wt. % to 14 wt. %, from 10 wt. % to 12 wt. %, from 12 wt. % to 35 wt. %, from 12 wt. % to 30 wt. %, from 12 wt. % to 25 wt. %, from 12 wt.

% to 20 wt. %, from 12 wt. % to 18 wt. %, from 12 wt. % to 16 wt. %, from 12 wt. % to 14 wt. %, from 14 wt. % to 20 wt. %, from 14 wt. % to 35 wt. %, from 14 wt. % to 30 wt. %, from 14 wt. % to 25 wt. %, from 14 wt. % to 18 wt. %, from 14 wt. % to 16 wt. %, from 16 wt. % to 35 wt. %, from 16 wt. % to 30 wt. %, from 16 wt. % to 25 wt. %, from 16 wt. % to 20 wt. %, from 16 wt. % to 18 wt. %, from 18 wt. % to 35 wt. %, from 18 wt. % to 30 wt. %, from 18 wt. % to 25 wt. %, from 18 wt. % to 20 wt. %, from 20 wt. % to 35 wt. %, from 20 wt. % to 30 wt. %, from 20 wt. % to 25 wt. %, from 25 wt. % to 35 wt. %, from 25 wt. % to 30 wt. %, or from 30 wt. % to 35 wt. % crosslinker C by weight of the amphiphilic branched star polymer.

Figure 2:
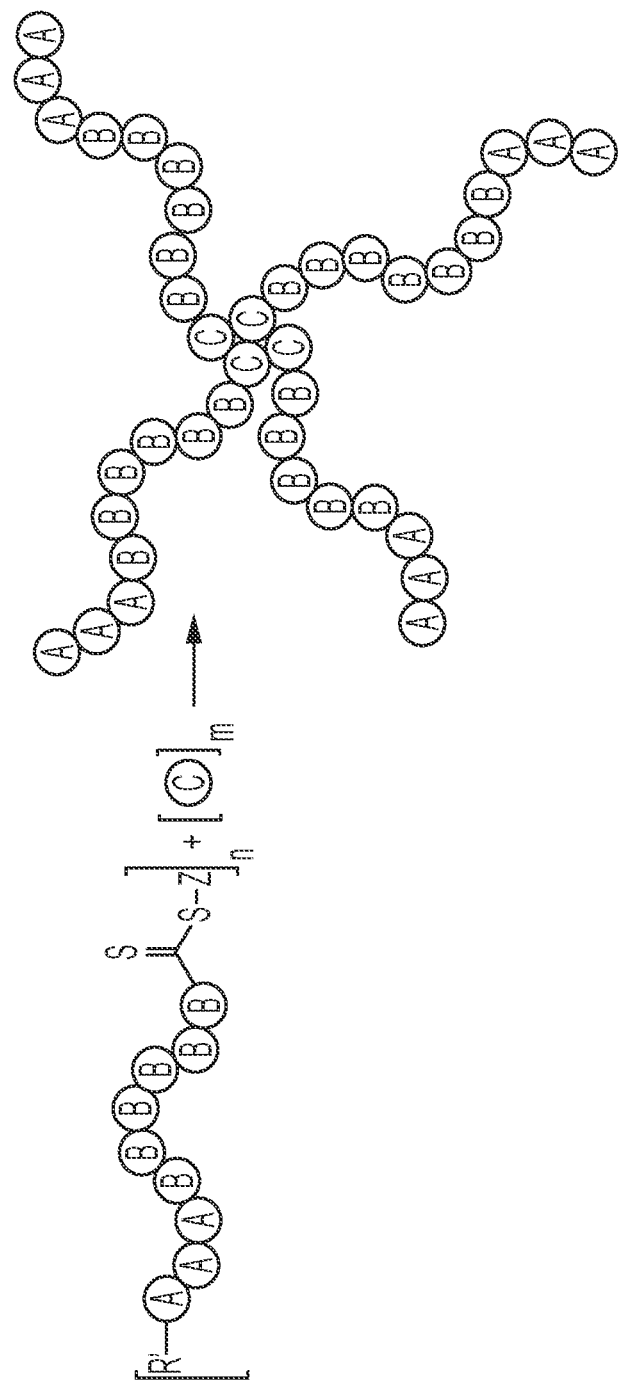
FIG. 2 schematically depicts the synthesis of an amphiphilic branched star polymer, according to one or more embodiments of this disclosure.

The polymerized reaction product may include a plurality of homopolymer segments of hydrophobic monomer B interconnected via crosslinker C, as shown in FIG. 1. In other embodiments, the polymerized reaction product may include a plurality of block copolymer segments of hydrophobic monomer B and hydrophilic monomer A interconnected via crosslinker C, as shown in FIG. 2. In yet another embodiment, the polymerized reaction product may include both a plurality of homopolymer segments of hydrophobic monomer B interconnected via crosslinker C and a plurality of block copolymer segments of hydrophobic monomer B and hydrophilic monomer A interconnected via crosslinker C (not shown). In other embodiments, the polymerized reaction product may include a plurality of block copolymer segments of hydrophilic monomer A, hydrophilic/hydrophobic monomer B, and hydrophilic/hydrophobic monomer D interconnected via crosslinker C (not shown). In yet another embodiment, the polymerized reaction product may include both a plurality of block copolymer segments of hydrophilic monomer A and hydrophilic/hydrophobic monomer B interconnected via crosslinker C and a plurality of block copolymer segments of hydrophilic monomer A, hydrophilic/hydrophobic monomer B, and hydrophilic/hydrophobic monomer D interconnected via crosslinker C (not shown).

The synthesis of the amphiphilic or hydrophobic branched star polymer may include reversible addition-fragmentation chain transfer (RAFT) polymerization. RAFT polymerization require the use of (I) initiators, (II) RAFT agents, and (III) monomers (for instance the monomers A, B, C, and optionally D as previously described).

The initiators begin the polymerization reactions and may include hydrogen peroxides, azo compounds, redox systems, alkali metals, ammonium persulfates, ammonium perborates, ammonium perchlorates, alkali metal persulfates, or combinations thereof. The redox systems may include hydrogen peroxide, alkyl peroxide, alkyl peresters, alkyl percarbonates, iron salt, titanous salt, zinc formaldehyde sulfoxylate or sodium formaldehyde sulfoxylate, or combinations thereof. In embodiments, the alkali metals, ammonium persulfates, ammonium perborates, or ammonium perchlorates may be used in combination with an alkali metal bisulfite, reducing sugars, or both. The alkali metal bisulfite may include sodium metabisulfite. In embodiments, the alkali metal persulfates may be used in combinations with an arylphosphinic acid, reducing sugars, or both. The arylphosphinic acid may include benzenephosphonic acid.

The hydrogen peroxides may include tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, or combinations thereof.

An azo compound is a compound bearing the functional group diazenyl R—N=N—R', in which R and R' can be either aryl or alkyl. The azo compounds may include 4,4'-Azobis(4-cyanovaleic acid), 2,2'-Azobis(2-methylpropionitrile), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]-propionamide, 2,2'-azobis(2-methyl-N-hydroxyethyl]propionamide, 2,2'-azobis(N,N'-dimethyleneisobutyramidine)dichloride, 2,2'-azobis(2-amidinopropane)dichloride, 2,2'-azobis(N,N'-dimethyleneisobutyramide), 2,2'-azobis(2-methyl-N-[1,1-bis(hydroxy-methyl)-2-hydroxyethyl]propionamide), 2,2'-azobis(2-methyl-N-[1,1-bis(hydroxy-methyl)ethyl] propionamide), 2,2'-azobis[2-methyl-N-(2-hydroxyethyl) propionamide], 2,2'-azobis(isobutyramide) dehydrate, or combinations thereof. In embodiments, the initiator may include 4,4'-azobis(4-cyanovaleic acid), 2,2'-azobis(2-methylpropionitrile), or both. The chemical structure of 4,4'-azobis(4-cyanovaleic acid) and 2,2'-azobis(2-methylpropionitrile) are shown below:

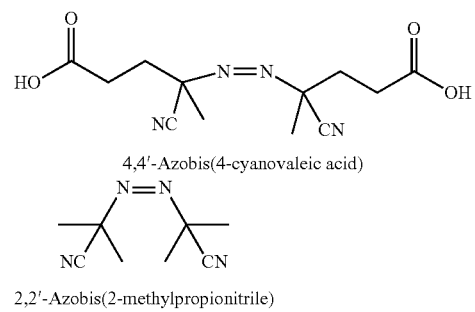

4,4'-Azobis(4-cyanovaleic acid)

2,2'-Azobis(2-methylpropionitrile)

The initiators may have an initiation temperature of from 50° C. to 80° C., from 50° C. to 75° C., from 50° C. to 70° C., from 50° C. to 65° C., from 50° C. to 60° C., from 50° C. to 55° C., from 55° C. to 80° C., from 55° C. to 75° C., from 55° C. to 70° C., from 55° C. to 65° C., from 55° C. to 60° C., from 60° C. to 80° C., from 60° C. to 75° C., from 60° C. to 70° C., from 60° C. to 65° C., from 65° C. to 80° C., from 65° C. to 75° C., from 65° C. to 70° C., from 70° C. to 80° C., from 70° C. to 75° C., or from 75° C. to 80° C. Without intending to be bound by theory, it may be desirable to have the initiation temperature be less than 100° C., less than 90° C., less than 85° C., less than 80° C., less than 75° C., less than 70° C., or less than 65° C. in order to be lower than a boiling temperature of the solvent.

The general structure of a RAFT agent is:

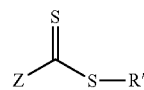

where Z referents a hydrogen atom, a chlorine atom, a sulfur atom, an optionally substituted alkyl or optionally substituted aryl radical, an optionally substituted heterocycle, an optionally substituted alkylthio radical, an optionally substituted arylthio radical, an optionally substituted alkylselenium radical, an optionally substituted arylselenium radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acycloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain; and R' represents an optionally substituted alkyl, acyl, aryl, aralkyl, alkenyl or alkynyl group; a saturated or unsaturated, aromatic, optionally substituted carbocycle or heterocycle; or a polymer chain, where the polymer chain may be hydrophilic.

The R' or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acycloxy (—O$_2$CR), carbamoyl(CONR$_2$), cyano (CN), alkylcarbonyl, alkylarylcarbonyl, arylcarbonyl, arylalkylcarbonyl, phthalimido, maleimido, succinimido, amidino, guanidimo, hydroxyl (—OH), amino (NR$_2$), halogen, perfluoroalkyl $C_nF_{2n+1}$, allyl, epoxy, alkoxy (OR), S-alkyl, S-aryl, Se-alkyl, Se-aryl groups exhibiting a hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The RAFT agents may include sulfur, nitrogen, oxygen, selenium, phosphorus, or combinations thereof. In embodiments, the RAFT agent may include sulfur and one or more of the group consisting of nitrogen, oxygen, selenium, and phosphorus. Without intending to be bound by theory, the RAFT agents include sulfur to ensure chemical stability at temperatures greater than or equal to 100° C., greater than or equal to 120° C., greater than or equal to 140° C., or greater than or equal to 150° C.

In embodiments, the structure of the RAFT agent may be:

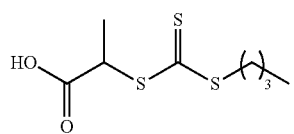

RAFT polymerization may occur as illustrated below:

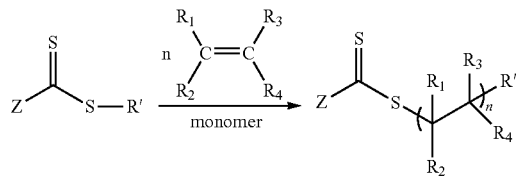

In embodiments, the RAFT polymerization may include 2 steps. The first step may be the initiation of the polymerization reaction, as shown below:

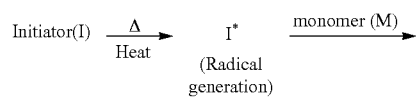

-continued

The second step may be the chain transfer reaction between radicals and the RAFT agent as shown below:

The amphiphilic branched star polymer may have a number averaged molecular weight of greater than 3000 grams per mole (g/mol), greater than 5000 g/mol, greater than 7500 g/mol, greater than 10,000 g/mol, greater than 50,000 g/mol, greater than 100,000 g/mol, greater than 300,000 g/mol, greater than 500,000 g/mol, greater than 1,000,000 g/mol, greater than 5,000,000 g/mol, or greater than 10,000,000 g/mol. The number averaged molecular weight is based on 100% conversion of monomer to polymer where all chains are expected to have consistent lengths.

The synthesis of the amphiphilic or hydrophobic branched star polymer may further include a desulfurization step to remove the thiocarbonylthio group (sulfur atoms) from the branched star polymer formed via RAFT polymerization. Removing the sulfur atoms may be desirable because the carbon-sulfur bonds may be cleaved at downhole temperatures, and undesirable hydrogen sulfide gas may be generated downhole if the sulfur atoms are present. The desulfurization step may include adding the branched star polymer to a desulfurization mixture in the presence of an initiator to form a desulfurized branched star polymer precursor. The desulfurization mixture may include toluene, isopropanol, or both. The desulfurization mixture may include from 30 to 70 wt. %, from 30 to 60 wt. %, from 30 to 55 wt. %, from 30 to 50 wt. %, from 30 to 45 wt. %, from 30 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, from 50 to 55 wt. %, from 55 to 70 wt. %, from 55 to 60 wt. %, or from 60 to 70 wt. % toluene by weight of the desulfurization mixture. The desulfurization mixture may include from 30 to 70 wt. %, from 30 to 60 wt. %, from 30 to 55 wt. %, from 30 to 50 wt. %, from 30 to 45 wt. %, from 30 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, from 50 to 55 wt. %, from 55 to 70 wt. %, from 55 to 60 wt. %, or from 60 to 70 wt. % isopropanol by weight of the desulfurization mixture.

The initiator may be any initiator as previously described. The desulfurized branched star polymer precursor may include from 10 to 50 wt. %, from 10 to 40 wt. %, from 10 to 30 wt. %, from 10 to 20 wt. %, from 20 to 50 wt. %, from 20 to 40 wt. %, from 20 to 30 wt. %, from 30 to 50 wt. %, from 30 to 40 wt. %, or from 40 to 50 wt. % initiator by weight of the branched star polymer formed via RAFT polymerization.

The desulfurized branched star polymer precursor may then be desulfurized by increasing the temperature. In embodiments, the temperature may be increased to greater than the half-life of the chosen initiator. For example and not by way of limitation, the half-life temperature of benzoyl peroxide is 92° C., so in embodiments where benzoyl peroxide is used, the temperature may be increased to greater than 92° C. Additionally, it may be beneficial to not increase the temperature to greater than the boiling point of the desulfurization mixture. For example and not by way of limitation, the boiling point of toluene is approximately 111° C., so in embodiments where the desulfurization mixture includes toluene, the temperature may not be increased to greater than 111° C. In embodiments, the temperature may be increased to a desulfurization temperature. The desulfurization temperature may be from 92° C. to 111° C., from 92° C. to 110° C., from 92° C. to 105° C., from 92° C. to 100° C., from 92° C. to 95° C., from 95° C. to 111° C., from 95° C. to 110° C., from 95° C. to 105° C., from 95° C. to 100° C., from 100° C. to 111° C., from 100° C. to 110° C., from 100° C. to 105° C., from 105° C. to 111° C., from 105° C. to 110° C., or to approximately 100° C.

The desulfurization step may further include purging the desulfurized branched star polymer precursor under nitrogen before increasing the temperature to the desulfurization temperature. It may be desirable to purge the desulfurized branched star polymer precursor under nitrogen to remove oxygen from the reaction. Oxygen may react with the initiator present, as the initiator decomposes at the desulfurization temperature, thereby limiting the desulfurization step. Therefore, the presence of oxygen may prematurely end the desulfurization reaction, so in embodiments it is desirable to purge with nitrogen to remove oxygen.

The drilling fluid may include from 0.50 to 10 wt. %, from 0.50 to 8 wt. %, from 0.50 to 6 wt. %, from 0.50 to 4 wt. %, from 0.50 to 2 wt. %, from 0.50 to 1.5 wt. %, from 0.50 to 1.25 wt. %, from 0.50 to 1.00 wt. %, from 0.50 to 0.80 wt. %, from 0.50 to 0.75 wt. %, from 0.50 to 0.65 wt. %, from 0.65 to 10 wt. %, from 0.65 to 8 wt. %, from 0.65 to 6 wt. %, from 0.65 to 4 wt. %, from 0.65 to 2 wt. %, from 0.65 to 1.5 wt. %, from 0.65 to 1.25 wt. %, from 0.65 to 1.00 wt. %, from 0.65 to 0.80 wt. %, from 0.65 to 0.75 wt. %, from 0.75 to 10 wt. %, from 0.75 to 8 wt. %, from 0.75 to 6 wt. %, from 0.75 to 4 wt. %, from 0.75 to 2 wt. %, from 0.75 to 1.5 wt. %, from 0.75 to 1.25 wt. %, from 0.75 to 1.00 wt. %, from 0.75 to 0.80 wt. %, from 0.80 to 10 wt. %, from 0.80 to 8 wt. %, from 0.80 to 6 wt. %, from 0.80 to 4 wt. %, from 0.80 to 2 wt. %, from 0.80 to 1.5 wt. %, from 0.80 to 1.25 wt. %, from 0.80 to 1.00 wt. %, from 1.00 to 10 wt. %, from 1.00 to 8 wt. %, from 1.00 to 6 wt. %, from 1.00 to 4 wt. %, from 1.00 to 2 wt. %, from 1.00 to 1.5 wt. %, from 1.00 to 1.25 wt. %, from 1.25 to 10 wt. %, from 1.25 to 8 wt. %, from 1.25 to 6 wt. %, from 1.25 to 4 wt. %, from 1.25 to 2 wt. %, from 1.25 to 1.5 wt. %, from 1.5 to 10 wt. %, from 1.5 to 8 wt. %, from 1.5 to 6 wt. %, from 1.5 to 4 wt. %, from 1.5 to 2 wt. %, from 2 to 10 wt. %, from 2 to 8 wt. %, from 2 to 6 wt. %, from 2 to 4 wt. %, from 4 to 10 wt. %, from 4 to 8 wt. %, from 4 to 6 wt. %, from 6 to 10 wt. %, from 6 to 8 wt. %, from 8 to 10 wt. %, or approximately 0.77 wt. % amphiphilic branched star polymer based on the total weight of the drilling fluid. The drilling fluid may include from 0.5 to 10 lb/bbl, from 0.5 to 8 lb/bbl, from 0.5 to 6 lb/bbl, from 0.5 to 4 lb/bbl, from 0.5 to 2 lb/bbl, from 0.5 to 1 lb/bbl, from 1 to 6 lb/bbl, from 1 to 4 lb/bbl, from 1 to 2 lb/bbl, from 2 to 10 lb/bbl, from 2 to 8 lb/bbl, from 2 to 6 lb/bbl, from 2 to 4 lb/bbl, from 4 to 10 lb/bbl, from 4 to 8 lb/bbl, from 4 to 6 lb/bbl, from 6 to 10 lb/bbl, from 6 to 8 lb/bbl, from 8 to 10 lb/bbl, approximately 2 lb/bbl, approximately 3 lb/bbl, approximately 4 lb/bbl, or approximately 6 lb/bbl amphiphilic branched star polymer.

The amphiphilic branched star polymer may have a hydrodynamic diameter determined via dynamic light scattering of from 5 nanometers (nm) to 100 nm, from 5 nm to 70 nm, from 5 nm to 60 nm, from 5 nm to 55 nm, from 5 nm to 50 nm, from 5 nm to 45 nm, from 5 nm to 35 nm, from 5 nm to 25 nm, from 5 nm to 20 nm, from 5 nm to 15 nm, from 5 nm to 10 nm, from 10 nm to 100 nm, from 10 nm to 70 nm, from 10 nm to 60 nm, from 10 nm to 55 nm, from 10 nm to 50 nm, from 10 nm to 45 nm, from 10 nm to 35 nm, from 10 nm to 25 nm, from 10 nm to 20 nm, from 10 nm to 15 nm, from 15 nm to 100 nm, from 15 nm to 70 nm, from 15 nm to 60 nm, from 15 nm to 55 nm, from 15 nm to 50 nm, from 15 nm to 45 nm, from 15 nm to 35 nm, from 15 nm to 25 nm, from 15 nm to 20 nm, from 5 nm to 100 nm, from 20 nm to 70 nm, from 20 nm to 60 nm, from 20 nm to 55 nm, from 20 nm to 50 nm, from 20 nm to 45 nm, from 20 nm to 35 nm, from 20 nm to 25 nm, from 25 nm to 100 nm, from 25 nm to 70 nm, from 25 nm to 60 nm, from 25 nm to 55 nm, from 25 nm to 50 nm, from 25 nm to 45 nm, from 25 nm to 35 nm, from 35 nm to 100 nm, from 35 nm to 70 nm, from 35 nm to 60 nm, from 35 nm to 55 nm, from 35 nm to 50 nm, from 35 nm to 45 nm, from 45 nm to 100 nm, from 45 nm to 70 nm, from 45 nm to 60 nm, from 45 nm to 55 nm, from 45 nm to 50 nm, from 50 nm to 100 nm, from 50 nm to 70 nm, from 50 nm to 60 nm, from 50 nm to 55 nm, from 55 nm to 100 nm, from 55 nm to 70 nm, from 55 nm to 60 nm, from 60 nm to 100 nm, from 60 nm to 70 nm, or from 70 nm to 100 nm. In embodiments, the branched star polymer may have a hydrodynamic diameter determined via dynamic light scatter of approximately 53 nm, approximately 17 nm, or approximately 15 nm. In embodiments, the branched star polymer having a hydrodynamic diameter from 5 nm to 100 nm (or approximately 53 nm, approximately 17 nm, or approximately 15 nm) may be used in emulsified drilling fluids. The dynamic light scattering measurements were performed using a Particle Analyzer Litesizer 500 running Kalliope software (40 mW, semiconductor laser, $\lambda$=658 nm). The temperature was stabilized to ±0.1° C. of the set temperature 25° C. Hydrodynamic radii were calculated by the non-negative least squares (NNLS) algorithm using the manufacturer's software.

The amphiphilic branched star polymer may have a hydrodynamic diameter determined via dynamic light scattering of from 100 nm to 200 nm, from 100 nm to 175 nm, from 100 nm to 150 nm, from 100 nm to 140 nm, from 100 nm to 130 nm, from 100 nm to 120 nm, from 120 nm to 200 nm, from 120 nm to 175 nm, from 120 nm to 150 nm, from 120 nm to 140 nm, from 120 nm to 130 nm, from 130 nm to 200 nm, from 130 nm to 175 nm, from 130 nm to 150 nm, from 130 nm to 140 nm, from 140 nm to 200 nm, from 140 nm to 175 nm, from 140 nm to 150 nm, from 150 nm to 200 nm, from 150 nm to 175 nm, from 175 nm to 200 nm, or approximately 137 nm. In embodiments, the branched star polymer having a hydrodynamic diameter from 100 nm to 200 nm (or approximately 137 nm) may be used in water-based drilling fluids. The dynamic light scattering measurements were performed using a Particle Analyzer Litesizer 500 running Kalliope software (40 mW, semiconductor laser, $\lambda$=658 nm). The temperature was stabilized to +0.1° C. of the set temperature 25° C. Hydrodynamic radii were calculated by the non-negative least squares (NNLS) algorithm using the manufacturer's software.

The branched star polymer may have a polydispersity index (PDI) determined via dynamic light scattering of from 5% to 50%, from 5% to 30%, from 5% to 25%, from 5% to 20%, from 5% to 17%, from 5% to 15%, from 5% to 12%, from 5% to 10%, from 10% to 50%, from 10% to 30%, from 10% to 25%, from 10% to 20%, from 10% to 17%, from 10% to 15%, from 10% to 12%, from 12% to 50%, from 12% to 30%, from 12% to 25%, from 12% to 20%, from 12% to 17%, from 12% to 15%, from 15% to 50%, from 15% to 30%, from 15% to 25%, from 15% to 20%, from 15% to 17%, from 17% to 50%, from 17% to 30%, from 17% to 25%, from 17% to 20%, from 20% to 50%, from 20% to 30%, from 20% to 25%, from 25% to 50%, from 25% to 30%, or from 30% to 50%. In embodiments, the branched star polymer may have a PDI determined via dynamic light scattering of approximately 12%, approximately 17%, approximately 20%, or approximately 25.1%. In embodiments, the branched star polymer may have a PDI determined via dynamic light scattering of from 5% to 50% (or approximately 12%, approximately 17%, or approximately 20%) may be used in emulsified drilling fluids. In embodiments, the branched star polymer may have a PDI determined via dynamic light scattering of from 5% to 50% (or approximately 25.1%) may be used in water-based drilling fluids.

In some embodiments, the drilling fluid may contain at least one additive other than the amphiphilic branched star polymer. The one or more additives may be any additives known to be suitable for drilling fluids. As non-limiting examples, suitable additives may include weighting agents, fluid loss control agents, lost circulation control agents, viscosifiers, dispersants, pH buffers, electrolytes, glycols, glycerols, dispersion aids, corrosion inhibitors, defoamers, starches, xanthan gum polymers, surfactants, or combinations thereof. In particular some embodiments, the one or more additives may include organoclay, such as VG 69 organoclay, which is an amine-treated bentonite used as a viscosifier and gelling agent that is commercially available from Schlumberger (Houston, TX). The one or more additives may also include a filtration control agent, such as ADAPTA® brand filtration control agent, which is a methylstyrene acrylate copolymer used to provide filtration control in non-aqueous systems, that is commercially available from Halliburton (Houston, TX). In some embodiments, the drilling fluid may contain both an organoclay and a filtration control agent.

In some embodiments, the one or more additives may include a viscosifier, also referred to as a rheology modifier, which may be added to the drilling fluid to impart non-Newtonian fluid rheology to the drilling fluid to facilitate lifting and conveying rock cuttings to the surface of the wellbore. Examples of viscosifiers may include, but are not limited to, bentonite, polyacrylamide, polyanionic cellulose, or combinations of these viscosifiers. In some embodiments, the drilling fluid may include xanthan gum, a polysaccharide commonly referred to xanthan gum. The xanthan gum may be added to the water-based drilling fluid to produce a flat velocity profile of the water-based drilling fluid in annular flow that may help to improve the efficiency of the drilling fluid in lifting and conveying rock cuttings to the surface.

The drilling fluid may include at least one surfactant. The surfactant may be anionic, cationic, or neutral. Nonlimiting examples of anionic surfactants include sulfonated polymers, sulfonated alkanes, polycarboxylated ethers, or combinations thereof. Nonlimiting examples of cationic surfactants include trimethylalkylammonium salts, alkylbenzylammonium salts, or combinations thereof. Nonlimiting examples of neutral surfactants include proteins, polyethylene glycol derivatives, oligosaccharides, cholesterol derivatives, or combinations thereof. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The drilling fluid may contain from 0.01 wt. % to 20 wt. % of the surfactant based on the total weight of the drilling fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

In some embodiments, the drilling fluid may contain from 0.01 wt. % to 20 wt. % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

In some embodiments, the one or more additives may include solids, sometimes referred to as weighting material, which may be dispersed in the drilling fluid. The solids may be finely divided solids having a specific gravity (SG) of greater than 1 that may be added to the drilling fluid to increase the density of the drilling fluid. Examples of weighting materials suitable for use as the solid include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), or any combination of these weighting materials. In some embodiments, the drilling fluid may include barite as the solid.

In embodiments, the drilling fluid may have a solids content of from 1 wt. % to 80 wt. % based on the weight of the solid weighing material based on the total weight of the drilling fluid. The drilling fluid may have a solids content of from 2.5 lb/bbl to 720 lb/bbl, such as from 2.5 to 720 lb/bbl, or 2.5 to 700 lb/bbl. In some embodiments, the drilling fluid may have a solids content of from 5 to 700 lb/bbl, from 50 to 500 lb/bbl, or from 100 to 600 lb/bbl.

Alternatively, in some embodiments, solids may not be needed to stabilize the drilling fluid. Thus, in some embodiments, the drilling fluid may not contain solids, or may not contain more than 2 lbs/bbl, such as less than 1 lb/bbl of solids.

As stated, the addition of solids may be used to control the density of the drilling fluid. In some embodiments, the drilling fluid may have a density of from 50 pounds of mass per cubic foot (pcf) to 160 pcf, as measured using a mud balance in accordance with the American Petroleum Institute (API) recommended practice 13B-2. For instance, the drilling fluid may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the drilling fluid may have a density of from 50 pcf to 75 pcf, or from 75 pcf to 100 pcf, or from 120 pcf to 160 pcf.

A high pressure, high temperature filtration test is a test to measure static filtration behavior at a temperature of up to about 380° F. [193° C.]maximum, usually according to the specifications of API (such as API Recommended Practice for Field Testing Water Based Drilling Fluids, API RP 13B-1 and API Recommended Practice for Field Testing Oil Based Drilling Fluids, API RP 13B-2). Although the test can simulate downhole temperature conditions, it does not simulate downhole pressure. The total pressure in a cell conventionally does not exceed 700 psi [4900 kPa], and the differential pressure across the filter medium is conventionally 500 psi [3500 kPa].

Filtration tests may be used to evaluate the filtration properties of a fluid, such as a drilling fluid. Filtration behavior is affected by the quantity, type, and particle sizes, as well as temperature and pressure. Measuring filtration properties and observing filtrate and filter cake characteristics is fundamental to treatment and control. In this test, the filter press simulates filtration against a permeable formation at high temperatures and pressures. At the desired temperature, the sample is filtered across the filter media while pressure is applied to the top of the cell. Pressurization sources include carbon dioxide cartridges, bottled nitrogen, or an in-house gas supply.

In embodiments, the emulsified drilling fluid of this disclosure may have a fluid loss of less than 20 mL, less than 15 mL, less than 10 mL, less than 7 mL, less than 5.0 mL, less than 4.5 mL, less than 4.0 mL, less than 3.5 mL, less than 3.0 mL, less than 2.9 mL, less than 2.6 mL, less than 2.5 mL, less than 2.2 mL, less than 2.0 mL, less than 1.8 mL, less than 1.6 mL, less than 1.4 mL, less than 1.2 mL, or less than 1.0 mL in a standard API High Pressure High Temperature filter press after 30 minutes at 350° F. at a differential pressure of 500 psi. In embodiments, the emulsified drilling fluid of this disclosure may have a fluid loss of from 1.0 mL to 20 mL, from 1.0 mL to 15 mL, from 1.0 mL to 10 mL, from 1.0 mL to 5.0 mL, from 1.0 mL to 4.5 mL, from 1.0 mL to 4.0 mL, from 1.0 mL to 3.5 mL, from 1.0 mL to 3.0 mL, from 1.0 mL to 2.9 mL, from 1.0 mL to 2.6 mL, from 1.0 mL to 2.5 mL, from 1.0 mL to 2.2 mL, from 1.0 mL to 2.0 mL, from 1.0 mL to 1.8 mL, from 1.0 mL to 1.6 mL, from 1.0 mL to 1.4 mL, from 1.0 mL to 1.2 mL, from 1.2 mL to 20 mL, from 1.2 mL to 15 mL, from 1.2 mL to 10 mL, from 1.2 mL to 5.0 mL, from 1.2 mL to 4.5 mL, from 1.2 mL to 4.0 mL, from 1.2 mL to 3.5 mL, from 1.2 mL to 3.0 mL, from 1.2 mL to 2.9 mL, from 1.2 mL to 2.6 mL, from 1.2 mL to 2.5 mL, from 1.2 mL to 2.2 mL, from 1.2 mL to 2.0 mL, from 1.2 mL to 1.8 mL, from 1.2 mL to 1.6 mL, from 1.2 mL to 1.4 mL, from 1.4 mL to 20 mL, from 1.4 mL to 15 mL, from 1.4 mL to 10 mL, from 1.4 mL to 5.0 mL, from 1.4 mL to 4.5 mL, from 1.4 mL to 4.0 mL, from 1.4 mL to 3.5 mL, from 1.4 mL to 3.0 mL, from 1.4 mL to 2.9 mL, from 1.4 mL to 2.6 mL, from 1.4 mL to 2.5 mL, from 1.4 mL to 2.2 mL, from 1.4 mL to 2.0 mL, from 1.4 mL to 1.8 mL, from 1.4 mL to 1.6 mL, from 1.6 mL to 20 mL, from 1.6 mL to 15 mL, from 1.6 mL to 10 mL, from 1.6 mL to 5.0 mL, from 1.6 mL to 4.5 mL, from 1.6 mL to 4.0 mL, from 1.6 mL to 3.5 mL, from 1.6 mL to 3.0 mL, from 1.6 mL to 2.9 mL, from 1.6 mL to 2.6 mL, from 1.6 mL to 2.5 mL, from 1.6 mL to 2.2 mL, from 1.6 mL to 2.0 mL, from 1.6 mL to 1.8 mL, from 1.8 mL to 20 mL, from 1.8 mL to 15 mL, from 1.8 mL to 10 mL, from 1.8 mL to 5.0 mL, from 1.8 mL to 4.5 mL, from 1.8 mL to 4.0 mL, from 1.8 mL to 3.5 mL, from 1.8 mL to 3.0 mL, from 1.8 mL to 2.9 mL, from 1.8 mL to 2.6 mL, from 1.8 mL to 2.5 mL, from 1.8 mL to 2.2 mL, from 1.8 mL to 2.0 mL, from 2.0 mL to 20 mL, from 2.0 mL to 15 mL, from 2.0 mL to 10 mL, from 2.0 mL to 5.0 mL, from 2.0 mL to 4.5 mL, from 2.0 mL to 4.0 mL, from 2.0 mL to 3.5 mL, from 2.0 mL to 3.0 mL, from 2.0 mL to 2.9 mL, from 2.0 mL to 2.6 mL, from 2.0 mL to 2.5 mL, from 2.0 mL to 2.2 mL, from 2.2 mL to 20 mL, from 2.2 mL to 15 mL, from 2.2 mL to 10 mL, from 2.2 mL to 5.0 mL, from 2.2 mL to 4.5 mL, from 2.2 mL to 4.0 mL, from 2.2 mL to 3.5 mL, from 2.2 mL to 3.0 mL, from 2.2 mL to 2.9 mL, from 2.2 mL to 2.6 mL, from 2.2 mL to 2.5 mL, from 2.5 mL to 20 mL, from 2.5 mL to 15 mL, from 2.5 mL to 10 mL, from 2.5 mL to 5.0 mL, from 2.5 mL to 4.5 mL, from 2.5 mL to 4.0 mL, from 2.5 mL to 3.5 mL, from 2.5 mL to 3.0 mL, from 2.5 mL to 2.9 mL, from 2.5 mL to 2.6 mL, from 2.6 mL to 20 mL, from 2.6 mL to 15 mL, from 2.6 mL to 10 mL, from 2.6 mL to 5.0 mL, from 2.6 mL to 4.5 mL, from 2.6 mL to 4.0 mL, from 2.6 mL to 3.5 mL, from 2.6 mL to 3.0 mL, from 2.6 mL to 2.9 mL, from 2.9 mL to 20 mL, from 2.9 mL to 15 mL, from 2.9 mL to 10 mL, from 2.9 mL to 5.0 mL, from 2.9 mL to 4.5 mL, from 2.9 mL to 4.0 mL, from 2.9 mL to 3.5 mL, from 2.9 mL to 3.0 mL, from 3.0 mL to 20 mL, from 3.0 mL to 15 mL, from 3.0 mL to 10 mL, from 3.0 mL to 5.0 mL, from 3.0 mL to 4.5 mL, from 3.0 mL to 4.0 mL, from 3.0 mL to 3.5 mL, from 3.5 mL to 20 mL, from 3.5 mL to 15 mL, from 3.5 mL to 10 mL, from 3.5 mL to 5.0 mL, from 3.5 mL to 4.5 mL, from 3.5 mL to 4.0 mL, from 4.0 mL to 20 mL, from 4.0 mL to 15 mL, from 4.0 mL to 10 mL, from 4.0 mL to 5.0 mL, from 4.0 mL to 4.5 mL, from 4.5 mL to 20 mL, from 4.5 mL to 15 mL, from 4.5 mL to 10 mL, from 4.5 mL to 5.0 mL, from 5.0 mL to 20 mL, from 5.0 mL to 15 mL, from 5.0 mL to 10 mL, from 10 mL to 20 mL, from 10 mL to 15 mL, or from 15 mL to 20 mL in a standard API High Pressure High Temperature filter press after 30 minutes at 350° F. at a differential pressure of 500 psi.

In embodiments, the water-based drilling fluid of this disclosure may have a fluid loss of less than 20 mL, less than 15 mL, less than 10 mL, less than 7 mL, less than 6 mL, less than 5.6 mL, less than 5.5 mL, less than 5.1 mL, less than 5.0 mL, less than 4.8 mL, or less than 4.7 mL in a standard API Low Pressure Low Temperature filter press after 30 minutes at ambient temperature at a differential pressure of 100 psi. In embodiments, the water-based drilling fluid of this disclosure may have a fluid loss of from 1.0 mL to 20 mL, from 1.0 mL to 15 mL, from 1.0 mL to 10 mL, from 1.0 mL to 7.0 mL, from 1.0 mL to 6.0 mL, from 1.0 mL to 5.6 mL, from 1.0 mL to 5.5 mL, from 1.0 mL to 5.4 mL, from 1.0 mL to 5.1 mL, from 1.0 mL to 5.0 mL, from 1.0 mL to 4.7 mL, from 1.0 mL to 4.5 mL, from 1.0 mL to 4.0 mL, from 1.0 mL to 3.0 mL, from 1.0 mL to 2.0 mL, from 2.0 mL to 20 mL, from 2.0 mL to 15 mL, from 2.0 mL to 10 mL, from 2.0 mL to 7.0 mL, from 2.0 mL to 6.0 mL, from 2.0 mL to 5.6 mL, from 2.0 mL to 5.5 mL, from 2.0 mL to 5.4 mL, from 2.0 mL to 5.1 mL, from 2.0 mL to 5.0 mL, from 2.0 mL to 4.7 mL, from 2.0 mL to 4.5 mL, from 2.0 mL to 4.0 mL, from 2.0 mL to 3.0 mL, from 3.0 mL to 20 mL, from 3.0 mL to 15 mL, from 3.0 mL to 10 mL, from 3.0 mL to 7.0 mL, from 3.0 mL to 6.0 mL, from 3.0 mL to 5.6 mL, from 3.0 mL to 5.5 mL, from 3.0 mL to 5.4 mL, from 3.0 mL to 5.1 mL, from 3.0 mL to 5.0 mL, from 3.0 mL to 4.7 mL, from 3.0 mL to 4.5 mL, from 3.0 mL to 4.0 mL, from 4.0 mL to 20 mL, from 4.0 mL to 15 mL, from 4.0 mL to 10 mL, from 4.0 mL to 7.0 mL, from 4.0 mL to 6.0 mL, from 4.0 mL to 5.6 mL, from 4.0 mL to 5.5 mL, from 4.0 mL to 5.4 mL, from 4.0 mL to 5.1 mL, from 4.0 mL to 5.0 mL, from 4.0 mL to 4.7 mL, from 4.0 mL to 4.5 mL, from 4.5 mL to 20 mL, from 4.5 mL to 15 mL, from 4.5 mL to 10 mL, from 4.5 mL to 7.0 mL, from 4.5 mL to 6.0 mL, from 4.5 mL to 5.6 mL, from 4.5 mL to 5.5 mL, from 4.5 mL to 5.4 mL, from 4.5 mL to 5.1 mL, from 4.5 mL to 5.0 mL, from 4.5 mL to 4.7 mL, from 4.7 mL to 20 mL, from 4.7 mL to 15 mL, from 4.7 mL to 10 mL, from 4.7 mL to 7.0 mL, from 4.7 mL to 6.0 mL, from 4.7 mL to 5.6 mL, from 4.7 mL to 5.5 mL, from 4.7 mL to 5.4 mL, from 4.7 mL to 5.1 mL, from 4.7 mL to 5.0 mL, from 5.0 mL to 20 mL, from 5.0 mL to 15 mL, from 5.0 mL to 10 mL, from 5.0 mL to 7.0 mL, from 5.0 mL to 6.0 mL, from 5.0 mL to 5.6 mL, from 5.0 mL to 5.5 mL, from 5.0 mL to 5.4 mL, from 5.0 mL to 5.1 mL, from 5.1 mL to 20 mL, from 5.1 mL to 15 mL, from 5.1 mL to 10 mL, from 5.1 mL to 7.0 mL, from 5.1 mL to 6.0 mL, from 5.1 mL to 5.6 mL, from 5.1 mL to 5.5 mL, from 5.1 mL to 5.4 mL, from 5.4 mL to 20 mL, from 5.4 mL to 15 mL, from 5.4 mL to 10 mL, from 5.4 mL to 7.0 mL, from 5.4 mL to 6.0 mL, from 5.4 mL to 5.6 mL, from 5.4 mL to 5.5 mL, from 5.5 mL to 20 mL, from 5.5 mL to 15 mL, from 5.5 mL to 10 mL, from 5.5 mL to 7.0 mL, from 5.5 mL to 6.0 mL, from 5.5 mL to 5.6 mL, from 5.6 mL to 20 mL, from 5.6 mL to 15 mL, from 5.6 mL to 10 mL, from 5.6 mL to 7.0 mL, from 5.6 mL to 6.0 mL, from 6.0 mL to 20 mL, from 6.0 mL to 15 mL, from 6.0 mL to 10 mL, from 6.0 mL to 7.0 mL, from 7.0 mL to 20 mL, from 7.0 mL to 15 mL, from 7.0 mL to 10 mL, from 10 mL to 20 mL, from 10 mL to 15 mL, from 15 mL to 20 mL, approximately 4.6 mL, approximately 5.0 mL, or approximately 5.5 mL in a standard API Low Pressure Low Temperature filter press after 30 minutes at ambient temperature at a differential pressure of 100 psi.

In embodiments, the water-based drilling fluid of this disclosure may have a fluid loss of less than 50 mL, less than 45 mL, less than 40 mL, less than 35 mL, less than 30 mL, less than 25 mL, less than 20 mL, or less than 10 mL in a standard API High Pressure High Temperature filter press after 30 minutes at 300° F. at a differential pressure of 500 psi. In embodiments, the emulsified drilling fluid of this disclosure may have a fluid loss of from 10 mL to 50 mL, from 10 mL to 45 mL, from 10 mL to 40 mL, from 10 mL to 35 mL, from 10 mL to 30 mL, from 10 mL to 25 mL, from 10 mL to 20 mL, from 20 mL to 50 mL, from 20 mL to 45 mL, from 20 mL to 40 mL, from 20 mL to 35 mL, from 20 mL to 30 mL, from 20 mL to 25 mL, from 25 mL to 50 mL, from 25 mL to 45 mL, from 25 mL to 40 mL, from 25 mL to 35 mL, from 25 mL to 30 mL, from 30 mL to 50 mL, from 30 mL to 45 mL, from 30 mL to 40 mL, from 30 mL to 35 mL, from 35 mL to 50 mL, from 35 mL to 45 mL, from 35 mL to 40 mL, from 40 mL to 50 mL, from 40 mL to 45 mL, or from 45 mL to 50 mL in a standard API High Pressure High Temperature filter press after 30 minutes at 300° F. at a differential pressure of 500 psi.

Fluid rheology is an important parameter of drilling fluid performance. For critical offshore applications with extreme temperature and pressure requirements (such as temperatures greater than 200° C. and pressures greater than 1,000 pounds per square inch (psi)), the viscosity profile of the fluid often is measured with a controlled temperature and pressure rotational viscometer (for instance, an iX77 rheometer, commercially available from Fann Instruments (Houston, TX)). Fluids may be tested at temperatures of from 35° F. to 500° F., with pressures of up to 20,000 psi. Cold-fluid rheology may be important because of the temperatures less than 32° F. that the fluid is exposed to in deepwater risers. Temperatures greater than 100° F. may be encountered in deep wells or in geothermally heated wells. The fluid may be under pressures greater than 2,000 psi downhole, and its viscosity profile may change accordingly. The rheological behavior of the drilling fluid, such as gel strength, plastic viscosity, and yield point, may be determined from measurements of the Newtonian viscosity, shear stress, and shear rate.

The gel strength of a drilling fluid refers to the shear stress of the drilling fluid measured at a shear rate less than 10 RPM following a defined period of time during which the drilling fluid is maintained in a static state. In embodiments, the gel strength may be determined on a Fann 35 viscometer using the 3 RPM reading, which may be recorded after stirring the drilling fluid at 600 rpm to break the gel. The first reading may be noted after the drilling fluid is in a static condition for 10 seconds. The second reading may be noted 10 minutes after static conditions. It is contemplated that the 6 and 3 RPM numbers may indicate whether drilling fluids that under static conditions are capable of suspending barite and drill cuttings. The drilling fluids of the present disclosure may have a gel strength after 10 seconds of from 0.5 to 40 pounds force per 100 cubic feet ($lb_f/100$ $ft^2$). In some embodiments, the drilling fluid may have a gel strength after 10 seconds of from 5 to 40 $lb_f/100$ $ft^2$, from 5 to 32 $lb_f/100$ $ft^2$, from 5 to 30 $lb_f/100$ $ft^2$, from 5 to 25 $lb_f/100$ $ft^2$, from 5 to 20 $lb_f/100$ $ft^2$, from 5 to 16 $lb_f/100$ $ft^2$, from 5 to 13 $lb_f/100$ $ft^2$, from 5 to 12 $lb_f/100$ $ft^2$, from 5 to 11 $lb_f/100$ $ft^2$, from 5 to 10 $lb_f/100$ $ft^2$, from 5 to 8 $lb_f/100$ $ft^2$, from 5 to 6 $lb_f/100$ $ft^2$, from 6 to 40 $lb_f/100$ $ft^2$, from 6 to 32 $lb_f/100$ $ft^2$, from 6 to 30 $lb_f/100$ $ft^2$, from 6 to 25 $lb_f/100$ $ft^2$, from 6 to 20 $lb_f/100$ $ft^2$, from 6 to 16 $lb_f/100$ $ft^2$, from 6 to 13 $lb_f/100$ $ft^2$, from 6 to 12 $lb_f/100$ $ft^2$, from 6 to 11 $lb_f/100$ $ft^2$, from 6 to 10 $lb_f/100$ $ft^2$, from 6 to 8 $lb_f/100$ $ft^2$, from 8 to 40 $lb_f/100$ $ft^2$, from 8 to 32 $lb_f/100$ $ft^2$, from 8 to 30 $lb_f/100$ $ft^2$, from 8 to 25 $lb_f/100$ $ft^2$, from 8 to 20 $lb_f/100$ $ft^2$, from 8 to 16 $lb_f/100$ $ft^2$, from 8 to 13 $lb_f/100$ $ft^2$, from 8 to 12 $lb_f/100$ $ft^2$, from 8 to 11 $lb_f/100$ $ft^2$, from 10 to 40 $lb_f/100$ $ft^2$, from 10 to 32 $lb_f/100$ $ft^2$, from 10 to 30 $lb_f/100$ $ft^2$, from 10 to 25 $lb_f/100$ $ft^2$, from 10 to 20 $lb_f/100$ $ft^2$, from 10 to 16 $lb_f/100$ $ft^2$, from 10 to 13 $lb_f/100$ $ft^2$, from 10 to 12 $lb_f/100$ $ft^2$, from 10 to 11 $lb_f/100$ $ft^2$, from 11 to 40 $lb_f/100$ $ft^2$, from 11 to 32 $lb_f/100$ $ft^2$, from 11 to 30 $lb_f/100$ $ft^2$, from 11 to 25 $lb_f/100$ $ft^2$, from 11 to 20 $lb_f/100$ $ft^2$, from 11 to 16 $lb_f/100$ $ft^2$, from 11 to 13 $lb_f/100$ $ft^2$, from 11 to 12 $lb_f/100$ $ft^2$, from 12 to 40 $lb_f/100$ $ft^2$, from 12 to 32 $lb_f/100$ $ft^2$, from 12 to 30 $lb_f/100$ $ft^2$, from 12 to 25 $lb_f/100$ $ft^2$, from 12 to 20 $lb_f/100$ $ft^2$, from 12 to 16 $lb_f/100$ $ft^2$, from 12 to 13 $lb_f/100$ $ft^2$, from 13 to 40 $lb_f/100$ $ft^2$, from 13 to 32 $lb_f/100$ $ft^2$, from 13 to 30 $lb_f/100$ $ft^2$, from 13 to 25 $lb_f/100$ $ft^2$, from 13 to 20 $lb_f/100$ $ft^2$, from 13 to 16 $lb_f/100$ $ft^2$, from 15 to 40 $lb_f/100$ $ft^2$, from 15 to 32 $lb_f/100$ $ft^2$, from 15 to 30 $lb_f/100$ $ft^2$, from 15 to 25 $lb_f/100$ $ft^2$, from 15 to 20 $lb_f/100$ $ft^2$, from 20 to 40 $lb_f/100$ $ft^2$, from 20 to 32 $lb_f/100$ $ft^2$, from 20 to 30 $lb_f/100$ $ft^2$, from 20 to 25 $lb_f/100$ $ft^2$, from 25 to 40 $lb_f/100$ $ft^2$, from 25 to 32 $lb_f/100$ $ft^2$, from 25 to 30 $lb_f/100$ $ft^2$, from 30 to 40 $lb_f/100$ $ft^2$, from 30 to 32 $lb_f/100$ $ft^2$, or from 32 to 40 $lb_f/100$ $ft^2$.

Similarly, the drilling fluids of the present disclosure may have a gel strength after 10 minutes of from 0.5 to 50 $lb_f/100$ $ft^2$. In some embodiments, the drilling fluid may have a gel strength after 10 minutes of from 10 to 50 $lb_f/100$ $ft^2$, from 10 to 48 $lb_f/100$ $ft^2$, from 10 to 40 $lb_f/100$ $ft^2$, from 10 to 35 $lb_f/100$ $ft^2$, from 10 to 30 $lb_f/100$ $ft^2$, from 10 to 25 $lb_f/100$ $ft^2$, from 10 to 20 $lb_f/100$ $ft^2$, from 10 to 15 $lb_f/100$ $ft^2$, from 15 to 50 $lb_f/100$ $ft^2$, from 15 to 48 $lb_f/100$ $ft^2$, from 15 to 40 $lb_f/100$ $ft^2$, from 15 to 35 $lb_f/100$ $ft^2$, from 15 to 30 $lb_f/100$ $ft^2$, from 15 to 25 $lb_f/100$ $ft^2$, from 15 to 20 $lb_f/100$ $ft^2$, from 20 to 50 $lb_f/100$ $ft^2$, from 20 to 48 $lb_f/100$ $ft^2$, from 20 to 40 $lb_f/100$ $ft^2$, from 20 to 35 $lb_f/100$ $ft^2$, from 20 to 30 $lb_f/100$ $ft^2$, from 20 to 25 $lb_f/100$ $ft^2$, from 25 to 50 $lb_f/100$ $ft^2$, from 25 to 48 $lb_f/100$ $ft^2$, from 25 to 40 $lb_f/100$ $ft^2$, from 25 to 35 $lb_f/100$ $ft^2$, from 25 to 30 $lb_f/100$ $ft^2$, from 30 to 50 $lb_f/100$ $ft^2$, from 30 to 48 $lb_f/100$ $ft^2$, from 30 to 40 $lb_f/100$ $ft^2$, from 30 to 35 $lb_f/100$ $ft^2$, from 35 to 50 $lb_f/100$ $ft^2$, from 35 to 48 $lb_f/100$ $ft^2$, from 35 to 40 $lb_f/100$ $ft^2$, from 40 to 50 $lb_f/100$ $ft^2$, or from 40 to 48 $lb_f/100$ $ft^2$.

The rheological behavior of the drilling fluid may be determined by measuring the shear stress on the drilling fluid at different shear rates, which may be accomplished by measuring the shear stress or shear rate on the drilling fluid. The various shear rates are utilized as drilling fluid behaves as a rigid body at lesser shear stresses but flows as a viscous fluid at greater shear stresses. The rheology of the drilling fluid may be characterized by the plastic viscosity (PV) in centiPoise (cP) and the yield point (YP), which are parameters from the Bingham plastic rheology model. The PV is related to the resistance of the drilling fluid to flow due to mechanical interaction between the solids of the drilling fluid and represents the viscosity of the drilling fluid extrapolated to infinite shear rate. The PV reflects the type and concentration of the solids in the drilling fluid. The PV of a drilling fluid may be estimated by measuring the shear stress of the drilling fluid using the previously described rheometer at spindle speeds of 300 rotations per minute (RPM) and 600 RPM and subtracting the 300 RPM dial reading from the 600 RPM dial reading according to Equation 2:

$$PV(cP) = \text{(dial reading at 600 } RPM\text{)} - \text{(dial reading at 300 } RPM\text{)} \quad \text{Equation 2}$$

The drilling fluids of the present disclosure may have a PV of from 5 to 80 cP. In some embodiments, the drilling fluid may have a PV of from 55 to 80 cP, from 55 to 75 cP, from 55 to 70 cP, from 55 to 65 cP, from 55 to 60 cP, from 60 to 80 cP, from 60 to 75 cP, from 60 to 70 cP, from 60 to 65 cP, from 65 to 80 cP, from 65 to 75 cP, from 65 to 70 cP, from 70 to 80 cP, from 70 to 75 cP, or from 75 to 80 cP.

The drilling fluid behaves as a rigid body when the shear stress is less than the YP, and the drilling fluid flows as a viscous fluid when the shear stress is greater than the YP. In other words, the YP represents the amount of stress required to move the drilling fluid from a static condition. The YP is expressed as a force per area, such as pounds of force per one hundred square feet ($lb_f/100 \text{ ft}^2$). YP provides an indication of the solids carrying capacity of the drilling fluid through the annulus, which in simplified terms gives an indication of the drilling fluid's hole-cleaning ability. A drilling fluid having a YP of equal to or greater than 15 $lb_f/100 \text{ ft}^2$ is considered acceptable for drilling. The YP is determined by extrapolating the Bingham plastic rheology model to a shear rate of zero. The YP may be estimated from the PV (as measured in accordance with Equation 1, as previously described) according to Equation 3:

$$YP = \text{(dial reading at 300 } RPM\text{)} - PV \quad \text{Equation 3}$$

The drilling fluids of the present disclosure may have a YP of from 0.5 to 75 $lb_f/100 \text{ ft}^2$. In some embodiments, the drilling fluids of the present disclosure may have a YP of from 35 to 75 $lb_f/100 \text{ ft}^2$, from 35 to 70 $lb_f/100 \text{ ft}^2$, from 35 to 65 $lb_f/100 \text{ ft}^2$, from 35 to 60 $lb_f/100 \text{ ft}^2$, from 35 to 55 $lb_f/100 \text{ ft}^2$, from 35 to 50 $lb_f/100 \text{ ft}^2$, from 35 to 45 $lb_f/100 \text{ ft}^2$, from 35 to 40 $lb_f/100 \text{ ft}^2$, from 40 to 75 $lb_f/100 \text{ ft}^2$, from 40 to 70 $lb_f/100 \text{ ft}^2$, from 40 to 65 $lb_f/100 \text{ ft}^2$, from 40 to 60 $lb_f/100 \text{ ft}^2$, from 40 to 55 $lb_f/100 \text{ ft}^2$, from 40 to 50 $lb_f/100 \text{ ft}^2$, from 40 to 45 $lb_f/100 \text{ ft}^2$, from 45 to 75 $lb_f/100 \text{ ft}^2$, from 45 to 70 $lb_f/100 \text{ ft}^2$, from 45 to 65 $lb_f/100 \text{ ft}^2$, from 45 to 60 $lb_f/100 \text{ ft}^2$, from 45 to 55 $lb_f/100 \text{ ft}^2$, from 45 to 50 $lb_f/100 \text{ ft}^2$, from 50 to 75 $lb_f/100 \text{ ft}^2$, from 50 to 70 $lb_f/100 \text{ ft}^2$, from 50 to 65 $lb_f/100 \text{ ft}^2$, from 50 to 60 $lb_f/100 \text{ ft}^2$, from 50 to 55 $lb_f/100 \text{ ft}^2$, from 55 to 75 $lb_f/100 \text{ ft}^2$, from 55 to 70 $lb_f/100 \text{ ft}^2$, from 55 to 65 $lb_f/100 \text{ ft}^2$, from 55 to 60 $lb_f/100 \text{ ft}^2$, from 60 to 75 $lb_f/100 \text{ ft}^2$, from 60 to 70 $lb_f/100 \text{ ft}^2$, from 60 to 65 $lb_f/100 \text{ ft}^2$, from 65 to 75 $lb_f/100 \text{ ft}^2$, from 65 to 70 $lb_f/100 \text{ ft}^2$, or from 70 to 75 $lb_f/100 \text{ ft}^2$.

The drilling fluids of the present disclosure may have a filter cake thickness of less than 8/32 inches ("). Often times, muds with low fluid loss display a thick filter cake which is not ideal for drilling operations, such as a filter cake with a thickness greater than 8/32 inches. A thick filter cake may result in tight spots in the wellbore leading to excessive drag, pressure surges when pipes are moved due to decrease in hole diameter, differential pressure sticking of the drill string due to increased area of contact of pipe to thick filter cake, rapid build-up of sticking force in high permeability cake, primary cementing problems due to poor displacement of dehydrated mud, and excessive formation damage from mud filtrate. In embodiments, drilling fluids of the present disclosure may have a filter cake thickness of from 0.5/32" to 8/32", from 0.5/32" to 7/32", from 0.5/32" to 6/32", from 0.5/32" to 5/32", from 0.5/32" to 4/32", from 0.5/32" to 3/32", from 0.5/32" to 2.5/32", from 1/32" to 8/32", from 1/32" to 7/32", from 1/32" to 6/32", from 1/32" to 5/32", from 1/32" to 4/32", from 1/32" to 3/32", from 1/32" to 2.5/32", from 1.5/32" to 8/32", from 1.5/32" to 7/32", from 1.5/32" to 6/32", from 1.5/32" to 5/32", from 1.5/32" to 4/32", from 1.5/32" to 3/32", from 1.5" to 2.5/32", or approximately 2/32".

Embodiments of the disclosure further relate to methods of producing a drilling fluid. The produced drilling fluids may be in accordance with any of the embodiments previously described. The method may involve forming an amphiphilic branched star polymer as described previously. The method may further include mixing an aqueous phase, an oleaginous phase, or both; the clay-based component; and the amphiphilic branched star polymer to produce the drilling fluid. The aqueous phase, oleaginous phase, the clay-based component, and the amphiphilic branched star polymer may be in accordance with any of the embodiments previously described.

In some embodiments, mixing the aqueous phase, oleaginous phase, or both; clay-based component; and amphiphilic branched star polymer may include shearing. The drilling fluid may be mixed at a shear speed of from 4000 rotations per minute (RPM) to 16000 RPM. The mixture may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM. Without being bound by any particular theory, shearing the mixture may disperse the oleaginous phase in the aqueous phase to produce the drilling fluid, which may be emulsified. In some embodiments, the oil-to-water ratio (OWR) may range from 5:95 to 95:5.

The method may further include mixing at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, starches, xanthan gum polymers, surfactants, or combinations thereof with the aqueous phase, the clay-based component, and the amphiphilic branched star polymer to form the drilling fluid. The additives may be in accordance with any of the embodiments previously described.

Embodiments of the disclosure may also relate to methods for using the drilling fluid. The drilling fluid may be in accordance with any of the embodiments previously described. In some embodiments, the drilling fluid may be introduced into a subsurface formation. Introducing may involve injecting the drilling fluid into the subsurface formation, which in some embodiments may be a well. The drilling fluid may be circulated within the subsurface formation. In some embodiments, a mud pump may be used to inject the drilling fluid into the subsurface formation.

In some specific embodiments the disclosure relates to methods of using the drilling fluid for oil and gas drilling. The methods may include pumping the drilling fluid through a drill string to a drill bit and recirculating the drilling fluid. Recirculating the fluid may allow the drilling fluid to cool and lubricate the drill bit and to lift rock cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string. The fluid loss control additives within the drilling fluid may reduce fluid loss during circulation.

EXAMPLES

As mentioned, the drilling fluid of the present disclosure may have improved characteristics over conventional drilling fluids, for instance, reduced coefficient of friction, pumpability and hole-cleaning capability, among other characteristics. These attributes will be demonstrated by the Examples that follow.

To demonstrate the improved fluid loss characteristics of the present embodiments, drilling fluids were formulated in accordance with the present disclosure and tested in comparison to drilling fluids with conventional fluid loss control additives.

Example 1

Two branched star polymers for use in oil-based drilling fluids were synthesized (SP-01 and SP-02), two linear star polymers for use in oil-based drilling fluids were synthesized (LP-01 and LP-02, which were analogues of SP-01 and SP-02 without crosslinker), and a desulfurized branched star polymer for use in oil-based drilling fluids was synthesized (SP-01-G2).

The procedure for synthesizing the branched star polymers for oil-based drilling fluids is described below using acrylic acid (monomer A), lauryl acrylate (monomer B), and methylene bisacrylamide as a crosslinker (crosslinker C).

The apparatuses used for the procedure included two round bottom flasks: 50 mL & 250 mL were used, along with a thermocouple, a rubber septum, long and short needles, pipettes, electrical tape, a stirrer bar, a stirrer bar picker, and a thermal hot plate (a RT2 Advanced Hotplate Stirrer, available from Thermo Scientific).

The materials used for the procedure included acrylic acid (AA), polyacrylic acid (PAA), poly(acrylic acid)-block-poly (lauryl acrylate) (PAA-b-PLA), 2-(Butylthiocarbonothioyl-thio)propanoic acid (BTPA), 4,4'-Azobis(4-cyanovaleric acid) (ACPA), 2,2'-Azobis(2-methylpropionitrile)(AIBN), tetrahydrofuran (THF), methylene bisacrylamide (MBA), benzoyl peroxide (BPO), toluene, and isopropanol.

The materials used in synthesizing PAA are described in Table 1 below:

TABLE 1

Formulation for the synthesis of PAA.

| Materials | No. of Moles | Mass (g) | Volume (mL) | | |
|---|---|---|---|---|---|
| AA | 0.0280 | 2.02 | 1.922 | Monomer concentration | 4.658M |
| BTPA | 0.00187 | 0.4455 | | Total volume | 6.018 mL |
| Water | N/A | N/A | 3 | Total mass | 2.520 g |
| ACPA | 0.000196 | 0.0550 | | | |
| Ethanol | 0.01416 | 1.035 | 1.0965 | | |

The chemicals listed in Table 1 were placed in a 50 mL round bottom flask with a stirrer bar. The initial synthesis of PAA was then carried out. The reaction vessel was sealed with a septum and secured with electrical tape. The reaction vessel was then purged under nitrogen for 20-30 mins. The reaction was then carried out for 3 hours at 70° C. in a thermal bath while stirring. The reaction was stopped by cooling under room temperature followed by placing the reaction vessel in an ice bath. The reaction mixture was then dried overnight in a vacuum oven at 50° C. or under continuous air blowing to remove any solvent.

The materials used in synthesizing the block copolymer of PAA-block-PLA are described in Table 2 below:

TABLE 2

Formulation for the synthesis of block copolymer of PAA-block-PLA.

| Materials | No. of moles | Mass (g) | Volume (mL) | | |
|---|---|---|---|---|---|
| PAA | 0.00191 | 2.520 | | Monomer concentration | 1.111M |
| Lauryl Acrylate | 0.0478 | 11.48 | 12.99 | Total volume | 42.99 mL |
| AIBN | 0.000191 | 0.0314 | | Total mass | 14.03 g |
| THF | | | 30 | | |

THF was then added to the dried reaction mixture and stirred with a stirrer bar to dissolve the dried solid. The remaining materials from Table 2 were then added to the flask and stirred until complete homogenization is achieved. The flask was sealed with a septum and secured with electrical tape. The reaction was then purged under nitrogen for 30 minutes. The reaction was then carried out for 18 hours at 60° C. in a thermal bath while stirring. The reaction was stopped by cooling under room temperature followed by placing the reaction vessel in an ice bath.

The materials used in synthesizing the star polymer of PAA-block-PLA are described in Table 3 below:

TABLE 3

Formulation for the synthesis of star polymer of PAA-block-PLA.

| Materials | No. of moles | Mass (g) | Volume (mL) | | |
|---|---|---|---|---|---|
| PAA-b-PLA | 0.00191 | 14.03 | 42.99 | Polymer concentration | 0.0104M |
| Methylene biscaryl-amide | 0.0191 | 2.952 | | Total volume | 185.0 mL |
| AIBN | 0.000191 | 0.0314 | | Total mass | 17.02 g |
| THF | | | 142 | | |

After placing the reaction vessel in the ice bath, the reaction mixture was then transferred to a 250 mL round bottom flask. The materials from Table 3 were then added to the 250 mL round bottom flask and stirred. Complete homogenization was not achieved because methylene bisacrylamide has limited solubility in THF at room temperature. The flask was then sealed with a septum and secured with electrical tape. The reaction mixture was purged under nitrogen for 30 minutes. The reaction was carried out for 8 hours at 60° C. in a thermal bath while stirring. The reaction was stopped by cooling under room temperature followed by placing the reaction vessel in an ice bath. The reaction mixture was dried overnight in a vacuum oven at 50° C. or under continuous air blowing to remove any solvent. The dried material had a strong garlic odor, and therefore, needed to be processed chemically to remove the odor. This process involved the removal of the sulphur groups on the polymer (also referred to as "desulfurization").

The materials used in synthesizing the star polymer of PAA-block-PLA are described in Table 4 below:

TABLE 4

Formulation for the odor removal of star block copolymer of PAA-block-PLA.

| Star Polymer | Benzoyl peroxide | Toluene | Isopropanol |
|---|---|---|---|
| 5 g | 0.47 g | 30 mL | 30 mL |

The materials listed in Table 4 are then added to a 250 mL round bottomed flask. The flask is sealed with a septum and secured with electrical tape. The septum was tightly fastened to the flask to avoid the septum popping off upon heating. The mixture was then purged with nitrogen for 30 minutes. The reaction was carried out at 100° C. for 2 hours. The reaction was stopped by cooling under room temperature followed by placing the reaction vessel in an ice bath. The reaction mixture was dried under continuous air blowing to remove any solvent. Purification of the star polymer was then carried out by dissolving the reaction mixture in a minimum amount of THF followed by precipitation in methanol and then precipitation in water followed by vacuum filtration.

Figure 3:
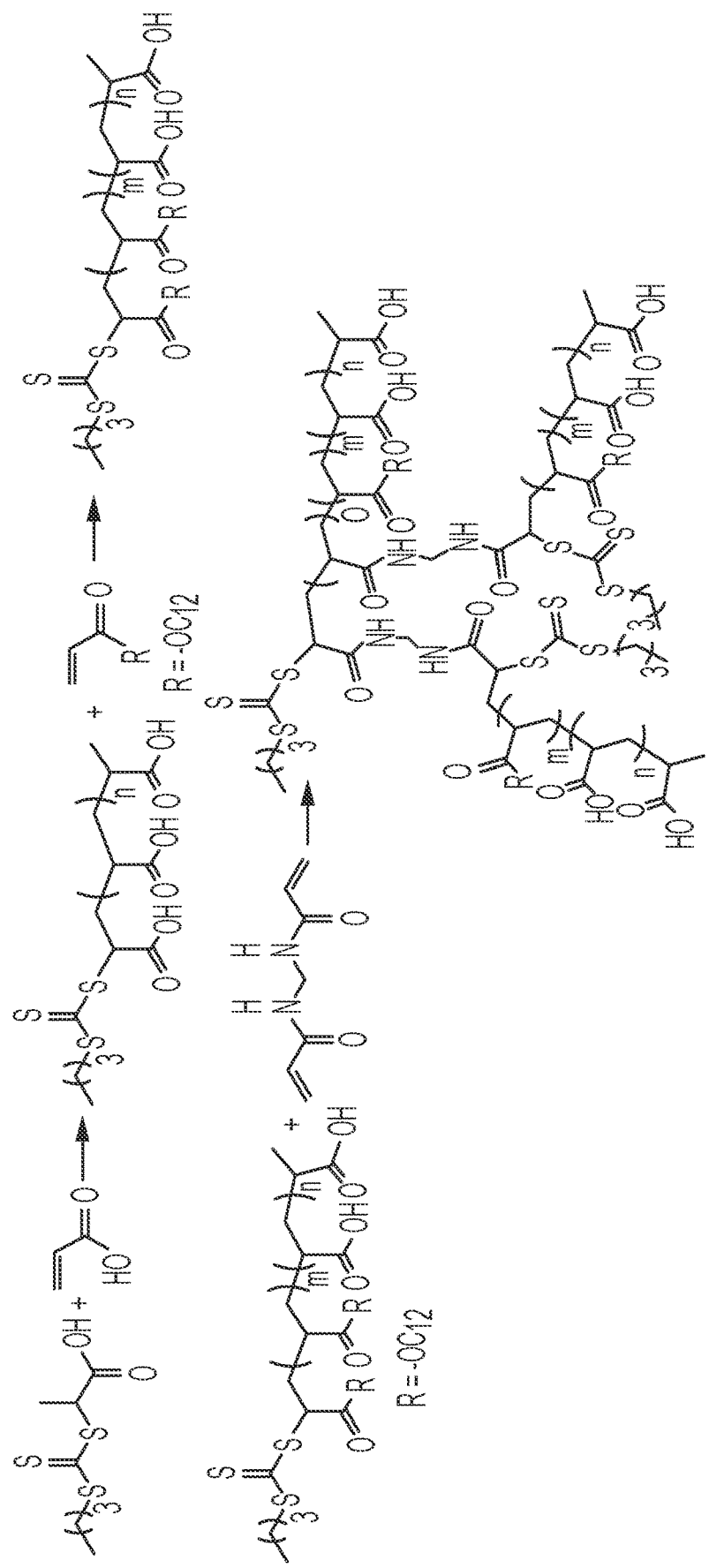
FIG. 3 schematically depicts the synthesis of an amphiphilic branched star polymer, according to one or more embodiments of this disclosure.

RAFT polymerization was used to initially polymerize a short segment of acrylic acid. Lauryl acrylate was then added again to enable synthesis of block copolymer poly (acrylic acid)-block-poly(lauryl acrylate). The synthesized block copolymer was then crosslinked with methylene bisacrylamide (crosslinker C) to form SP-01. The reaction mechanism is shown in FIG. 3. Based on thermogravimetric analysis, SP-01 began degrading at approximately 400° C. The hydrodynamic diameter of SP-01 was determined via dynamic light scattering to be approximately 17 nm.

Additionally, the polydispersity index (PDI) of SP-01 was determined via dynamic light scattering to be approximately 11.6%. The dynamic light scattering was conducted with the Litesizer 500 (available from Anton Paar). The PDI was calculated by the Litesizer 500 software. The PDI of particles is a representation of size distribution of particles. Based on the PDI of the particle measured, rough estimations of the particle distributions can be made. For example, a PDI of 0% may indicate that the particles are monodispersed and uniform, a PDI of 0-10% may indicate that the particles are monodispersed and narrow, a PDI of 10-40% may indicate that the particles are polydispersed and moderate, and a PDI of greater than 40% may indicate that the particles are polydispersed and broad. The polymeric nanoparticles may polydisperse in nature due to polymeric chains of different lengths. The Examples in this disclosure indicate that polydispersed nanoparticles in the narrow to moderate range with small hydrodynamic diameters provide the lowest fluid loss control.

Figure 4:
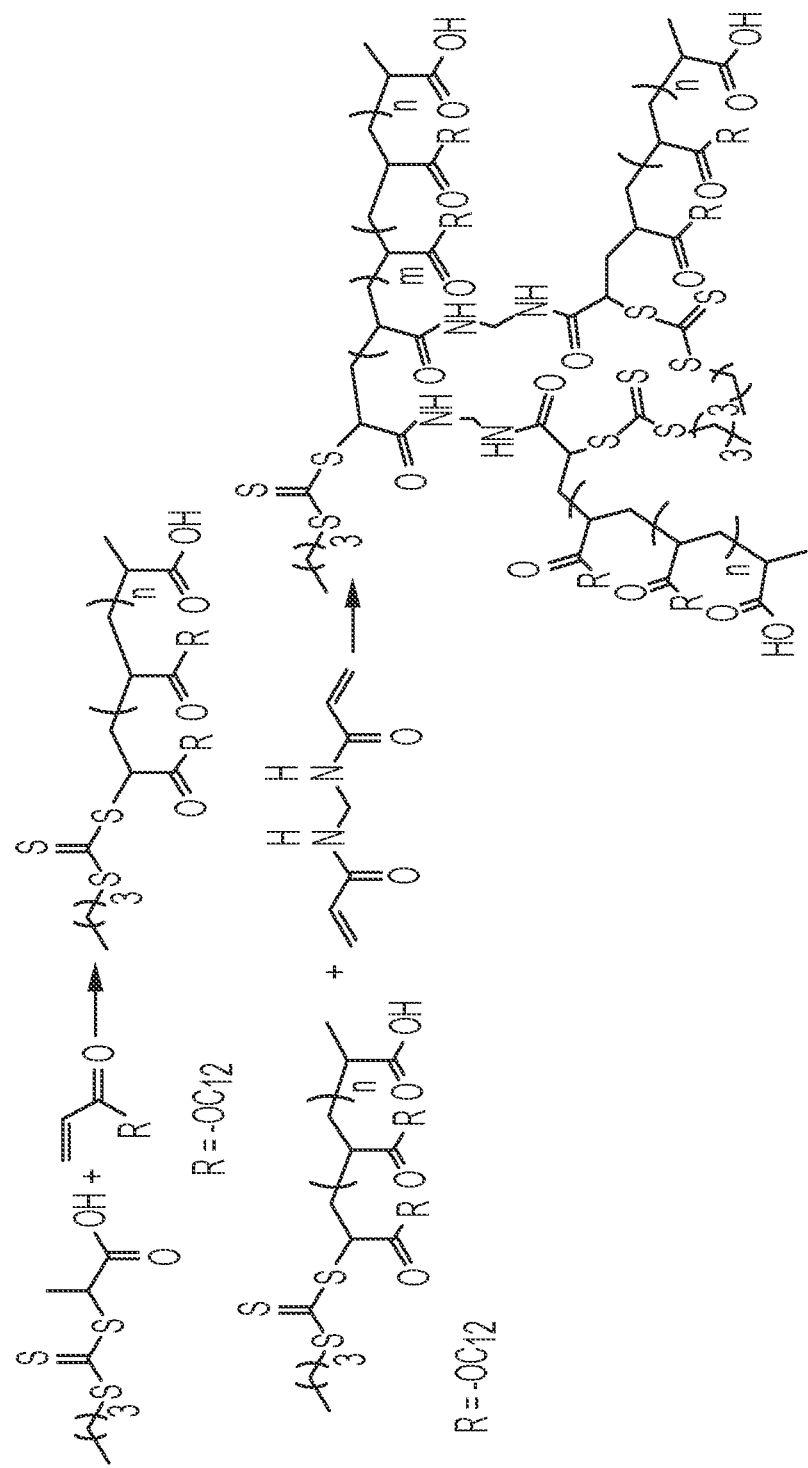
FIG. 4 schematically depicts the synthesis of a hydrophobic branched star polymer, according to one or more embodiments of this disclosure.

The hydrophobic branched star polymer SP-02 was synthesized using poly(lauryl acrylate) (monomer B), where RAFT polymerization was used to polymerize a short linear segment of lauryl acrylate, which was then crosslinked with methylene bisacrylamide (crosslinker C) to form the hydrophobic branched star polymer SP-02. The reaction mechanism is shown in FIG. 4. Based on thermogravimetric analysis, SP-02 began degrading at approximately 400° C. The hydrodynamic diameter of SP-02 was determined via dynamic light scattering to be approximately 15 nm. Additionally, the PDI of SP-02 was determined via dynamic light scattering to be approximately 16.7%.

The amphiphilic branched star polymer SP-01-G2 was then formed with the following steps. Acrylic acid was used as monomer A and lauryl acrylate was used as monomer B. RAFT polymerization was used to initially polymerize a short segment of acrylic acid. Lauryl acrylate was then added to enable synthesis of block copolymer poly(acrylic acid)-block-poly(lauryl acrylate). The synthesized block copolymer was then crosslinked with methylene bisacrylamide (crosslinker C) to form SP-01. An additional desulfurization step was then performed. The desulfurization was carried out by placing SP-01 in a 50/50 toluene/isopropanol mixture in the presence of a benzoyl peroxide initiator. The mixture was purged under nitrogen before performing the desulfurization at 100° C.

Based on thermogravimetric analysis, SP-01-G2 began degrading at approximately 400° C. The hydrodynamic diameter of SP-01-G2 was determined via dynamic light scattering to be approximately 53 nm. It was observed than when the hydrodynamic diameter of the branched star polymer is in the nanoscale, the branched star polymer is able to provide low fluid loss and thin filter cake. Commercial products with larger hydrodynamic diameter provided higher fluid loss values and/or thicker filter cakes. In particular, Pliolite DFO1 (described below) was found to have a hydrodynamic diameter of 206 nm. Additionally, Versatrol HT (described below) was found to have a hydrodynamic diameter of 350 microns. Low fluid loss values are desirable to minimize the change in rheology of drilling fluids during drilling due to loss of fluids into the formation. In addition, a thin filter cake during drilling ensures that a variety of issues, such as stuck pipe, are avoided. Branched star polymer with smaller diameters, such as those within the nanoscale, are able to fill up the porosity of the filter cakes more efficiently than particles with larger diameters. This provides a filter cake with better sealing and reduces the loss of fluids into the formation.

Additionally, the PDI of SP-01-G2 was determined via dynamic light scattering to be approximately 20%. The PDI of Pliolite DFO1 was determined via dynamic light scattering to be approximately 5.79%. The PDI of Versatrol HT was determined via dynamic light scattering to be approximately 33.1%.

To formulate the drilling fluids, diesel, Geltone V, Versamul, Versacoat, lime, and RM63 were added sequentially within 1-2 minutes apart and sheared for 20 minutes. Geltone V was a viscosifier available from Halliburton. Versamul was an emulsifier available from Schlumberger. Versacoat was a surfactant available from Schlumberger. RM-63 was a polymeric rheology modifier available from Baroid. Calcium chloride saturated brine & DI water, and optionally the fluid loss control additive, were then added sequentially within 1-2 minutes apart and sheared for 20 minutes. Barite was then added and shearing was carried out for 20 minutes. RevDust was then added and shearing was carried out for 5 minutes. The drilling fluid was then pressurized at 500 pounds per square inch (psi) in a pressure cell and hot rolled at 350° F. for 16 hours.

SP-01, SP-02, LP-01, LP-02, and Versatrol HT were added to a drilling fluid having the composition shown in Table 5 to form drilling fluids B, C, D, E, and F. Drilling fluid A did not have a fluid loss control additive. LP-01 and LP-02 were linear analogues of SP-01 and SP-02 without crosslinker. LP-01 included block copolymer of poly(acrylic acid)-block-poly(lauryl acrylate) without a crosslinker. Similarly, LP-02 included poly(lauryl acrylate) homopolymer without a crosslinker. Versatrol HT was an asphalt resin available from Schlumberger.

TABLE 5

Base drilling fluid composition for drilling fluids A-F

| Component | Weight (grams) |
|---|---|
| Diesel | 192 |
| Geltone V | 2 |
| Lime | 6 |
| Versamul | 8 |
| Versacoat | 4 |
| Water | 22.48 |
| $CaCl_2$ brine | 53.27 |
| RM-63 | 2 |
| Fluid loss control additive | 4 |
| Barite | 209 |
| Rev dust | 20 |

The total weight of the drilling fluid was 522.75 grams, and the drilling fluid had a density of 12 pounds per gallon. Therefore, the drilling fluids included approximately 0.77 wt. % fluid loss control additive.

SP-01-G2, Pliolite DFO1, and Versatrol HT were added to drilling fluids using the method described previously, and formed drilling fluids G, H, and I having the composition shown in Table 6. Pliolite DFO1 was a styrene butadiene polymer drilling fluid loss control additive available from Eliokem (now available as Pexotrol 552 from Omnova Solutions). Drilling fluid J did not have a fluid loss control additive.

TABLE 6

Drilling fluid composition for drilling fluids G-J

| Fluid Formulations (lb/bbl) | Drilling fluid G | Drilling fluid H | Drilling fluid I | Drilling fluid J |
|---|---|---|---|---|
| Diesel | 178.3 | 178.3 | 178.3 | 178.3 |
| Geltone V | 4 | 4 | 4 | 4 |
| RM63 | 2 | 2 | 2 | 2 |
| Lime | 10 | 10 | 10 | 10 |
| Versamul | 10 | 10 | 10 | 10 |
| Versacoat | 5 | 5 | 5 | 5 |
| DI water | 18.58 | 18.58 | 18.58 | 18.58 |
| Calcium chloride saturated brine | 53.27 | 53.27 | 53.27 | 53.27 |
| SP-01-G2 | 3.6 | — | — | — |
| Pliolite DF01 | — | 4 | — | — |
| Versatrol HT | — | — | 4 | — |
| Barite | 280 | 280 | 280 | 280 |
| Rev Dust | 50 | 50 | 50 | 50 |
| Density, lb/gal | 13.4 | 13.4 | 13.4 | 13.4 |
| Aging temp., ° F. | 300 | 300 | 300 | 300 |
| Aging conditions | rolling | rolling | rolling | rolling |
| Aging period, hr | 16 | 16 | 16 | 16 |

The Roller Oven model 705ES, manufactured by Fann, was used for the hot rolling experiment conducted at 300° F. and atmospheric pressure for 16 hours. The Electrical Stability Tester model 23E, manufactured by Fann, was used to measure the relative chemical stability of the drilling fluid both before and after hot rolling. Conventionally, a value of greater than 200 volts is considered to be a chemically stable invert emulsion. A fluid loss test was conducted on the drilling fluid with a Fann High Pressure High Temperature (HPHT) Filter Press Series 387 (175 mL) which comes equipped with Fann Model 741 Temperature Controller. The fluid loss test was conducted at 350° F. at a differential pressure of 500 psi for 30 minutes. The table below shows the electrical stability of the drilling fluids before hot rolling (BHR) and after hot rolling (AHR), as well as the results of the fluid loss test conducted.

TABLE 7

Drilling fluid properties.

| Drilling fluid | Fluid loss control additive | Electrical stability BHR (volts) | Electrical stability AHR (volts) | Fluid loss (mL) | Filter cake thickness (inches) |
|---|---|---|---|---|---|
| A | None | 666 | 167 | 30 | — |
| B | Versatrol HT | 729 | 282 | 2 | — |
| C | SP-01 | 724 | 473 | 2.4 | — |
| D | SP-02 | 503 | 557 | 2.8 | — |
| E | LP-01 | 389 | 250 | 4.4 | — |
| F | LP-02 | 625 | 310 | 4.0 | — |
| G | SP-01-G2 | 582 | 385 | <1 | 2/32" |
| H | Pliolite DF01 | 476 | 238 | 2.8 | 8/32" |
| I | Versatrol HT | 580 | 308 | 8.2 | 16/32" |
| J | None | 491 | 273 | 2.8 | 16/32" |

Table 7 shows that the drilling fluids including branched star polymers (drilling fluids C, D, and G) had much lower fluid loss than the drilling fluids including the linear star polymers (drilling fluids E and F) that were not crosslinked. Therefore, crosslinking the star polymer seems to decrease fluid loss. Additionally, drilling fluid C exhibited lower fluid loss than drilling fluids A, H, I, and J, which had either no fluid loss control additive, or had conventional fluid loss control additives.

Table 7 further shows that drilling fluids including Versatrol HT (drilling fluids B and I) exhibit a relatively large stability drop after hot rolling as compared to drilling fluids including branched star polymers (drilling fluids C, D, and G).

Based on Table 7, SP-01-G2 was able to provide not only fluid loss control but also ensure a thin filter cake. SP-01-G2 resulted in less fluid loss than SP-01 because SP-01-G2 does not have a reactive thiocarbonylthio RAFT end groups. The lack of carbon-sulphur (C—S) bond in SP-01-G2 in comparison to SP-01 provides a higher temperature stability to the former as the C—S can decompose at temperatures greater than 120° C. The higher temperature stability of SP-01-G2 results in a lower degradation during hot rolling and HTHP fluid loss testing as compared to SP-01. But the low fluid loss values for SP-01-G2 can be associated with higher temperature stability of SP-01-G2 (with the lack of C—S bond) over SP-01.

The thickness of the filter cake was determined by using a pair of calipers. Drilling fluid G exhibited a filter cake thickness of approximately 2/32", whereas Drilling Fluids H, I, and J each exhibited a filter cake thickness of 8/32" or greater.

Example 2

Amphiphilic branched star polymer FLCA-134 having an HLB of approximately 12.164 was synthesized using acrylic acid (monomer A), lauryl acrylate (monomer B), and methylene bisacrylamide as a crosslinker (crosslinker C).

The procedure for synthesizing branched star polymers for water-based drilling fluids is described below.

The apparatuses used for the procedure included two round bottom flasks: 50 mL & 250 mL were used, along with a thermocouple, a rubber septum, long and short needles, pipettes, electrical tape, a stirrer bar, a stirrer bar picker, and a thermal hot plate (a RT2 Advanced Hotplate Stirrer, available from Thermo Scientific).

The materials used for the procedure included acrylic acid (AA), polyacrylic acid (PAA), poly(acrylic acid)-block-poly(lauryl acrylate) (PAA-b-PLA), 2-(Butylthiocarbonothioyl-thio)propanoic acid (BTPA), 2,2'-Azobis(2-methylpropionitrile)(AIBN), tetrahydrofuran (THF), and methylene bisacrylamide (MBA).

The materials used in synthesizing PAA are described in Table 8 below:

TABLE 8

Formulation for the synthesis of PAA.

| Materials | No. of Moles | Mass (g) | Volume (mL) | | |
|---|---|---|---|---|---|
| AA | 0.1593 | 11.48 | 10.92 | monomer concentration | 4.561M |
| BTPA | 0.00187 | 0.4468 | | total volume | 47.42 mL |
| THF | — | — | 36.5 | total mass | 11.93 g |
| AIBN | 0.000187 | 0.04468 | — | | |

The chemicals listed in Table 8 were placed in a 50 mL round bottom flask with a stirrer bar. The initial synthesis of PAA was then carried out. The reaction vessel was sealed with a septum and secured with electrical tape. The reaction vessel was then purged under nitrogen for 20-30 mins. The reaction was then carried out for 3 hours at 60° C. in a thermal bath while stirring. The reaction was stopped by cooling under room temperature followed by placing the reaction vessel in an ice bath. The reaction mixture was then dried overnight in a vacuum oven at 50° C. or under continuous air blowing to remove any solvent.

The materials used in synthesizing the block copolymer of PAA-block-PLA are described in Table 9 below:

TABLE 9

Formulation for the synthesis of block copolymer of PAA-block-PLA.

| Materials | No. of moles | Mass (g) | Volume (mL) | | |
|---|---|---|---|---|---|
| PAA | 0.00187 | 11.93 | | monomer concentration | 0.2465M |
| Lauryl Acrylate (LA) | 0.0187 | 4.505 | 5.096 | total volume | 76.019 mL |
| THF | | | 23.5 | total mass | 16.43 g |
| AIBN | 0.0002 | 0.0308 | | | |

THF was then added to the dried reaction mixture and stirred with a stirrer bar to dissolve the dried solid. The remaining materials from Table 9 were then added to the flask and stirred until complete homogenization is achieved. The flask was sealed with a septum and secured with electrical tape. The reaction was then purged under nitrogen for 30 minutes. The reaction was then carried out for 18 hours at 60° C. in a thermal bath while stirring. The reaction was stopped by cooling under room temperature followed by placing the reaction vessel in an ice bath.

The materials used in synthesizing the star polymer of PAA-block-PLA are described in Table 10 below:

TABLE 10

Formulation for the synthesis of star polymer of PAA-block-PLA.

| Materials | No. of moles | Mass (g) | Volume (mL) | | |
|---|---|---|---|---|---|
| PAA-b-PLA | 0.00187 | 16.43 | 76.02 | polymer concentration | 0.01M |

TABLE 10-continued

Formulation for the synthesis of star polymer of PAA-block-PLA.

| Materials | No. of moles | Mass (g) | Volume (mL) | | |
|---|---|---|---|---|---|
| Methylene biscarylamide | 0.0187 | 2.890 | | total volume | 193.1 mL |
| THF | | | 117.1 | total mass | 19.32 g |
| AIBN | 0.000187 | 0.0307 | | | |

Crosslinking of poly(acrylic acid)-block-poly(lauryl acrylate) (PAA-b-PLA) to form amphiphilic branched star polymer was carried using the formulation in Table 10. Polymerization of lauryl acrylate was carried out for 8 hours in an inert nitrogen environment while stirring at 60° C. Each poly(acrylic acid)-block-poly(lauryl acrylate) (PAA-b-PLA) chain had an average of 85 units of acrylic acid monomer and 10 units of lauryl acrylate crosslinked with 10 units of methylene bisacrylamide giving a theoretical number average molecular weight ($M_n$) of 10070 g/mol for each block copolymer chain.

The hydrophilic-lipophilic balance (HLB) of the amphiphilic block copolymer and amphiphilic branched star polymer FLCA-134 is the measure of the degree to which it is hydrophilic or lipophilic, which may be determined by the Griffin Method calculation, as previously described. The amphiphilic block copolymer had a molecular weight of PAA of approximately 6364 g/mol and a molecular weight of PAA-block-PLA of approximately 8529 g/mol. Therefore, the amphiphilic block copolymer had a HLB of approximately 14.92. The amphiphilic branched star polymer FLCA-134 had a molecular weight of PAA of approximately 6364 g/mol, a molecular weight of PAA-block-PLA of approximately 8529 g/mol, and a molecular weight of PAA-block-PLA-block-PMBA of approximately 10071 g/mol, Therefore, the amphiphilic branched star polymer FLCA-134 had a HLB of approximately 12.64.

The amphiphilic branched star polymer FLCA-134 had a PDI determined via dynamic light scattering of 25.1%. The amphiphilic branched star polymer FLCA-134 had a hydrodynamic diameter determined via dynamic light scattering of 137 nm. The dynamic light scattering measurements were performed using a Particle Analyzer Litesizer 500 running Kalliope software (40 mW, semiconductor laser, λ=658 nm). The temperature was stabilized to ±0.1° C. of the set temperature 25° C. Hydrodynamic radii were calculated by the non-negative least squares (NNLS) algorithm using the manufacturer's software.

To determine the ability of the amphiphilic branched star polymer FLCA-134 to provide fluid loss control, water-based drilling fluids were first formulated as shown in Table 11. Barathin Plus, available from Halliburton, was used as a deflocculant/thinner. The barite was available from MI SWACO under the commercial name M-I WATE* (ALL GRADES). The Aramco High Temperature Viscosifier was a methacrylate-based viscosifier. The MgO was available from Fritz Industries under the commercial name Fritz Bond EX-M. The KCl was available from Fisher Chemical under the commercial name Potassium Chloride (Crystalline).

TABLE 11

Drilling fluid composition for drilling fluids K, L, and M.

| Fluid Formulations (lb/bbl) | Drilling fluid K | Drilling fluid L | Drilling fluid M |
|---|---|---|---|
| Water | 276.5 | 276.5 | 276.5 |
| MgO (pH buffer) | 4.5 | 4.5 | 4.5 |
| KCl | 8 | 8 | 8 |
| Aramco High Temperature Viscosifier | 3.25 | 3.25 | 3.25 |
| Barathin Plus | 3 | 3 | 3 |
| Barite | 311 | 311 | 311 |
| Sepiolite Pangel S9 - Cary Company | 4 | 4 | 4 |
| FLCA-134 | — | 2 | 6 |
| Density, lb/gal | 14 | 14 | 14 |
| Aging temp., °F. | 300 | 300 | 300 |
| Aging conditions | rolling | rolling | rolling |
| Aging period, hr | 16 | 16 | 16 |
| pH before aging | 9.6 | 9.46 | 9.3 |
| pH after aging | 8.04 | 7.95 | 8.7 |

Drilling Fluids K, L, and M had the same base drilling fluid composition, but Drilling Fluid K did not include the amphiphilic branched star polymer FLCA-134, Drilling Fluid L included 2 lb/bbl of the amphiphilic branched star polymer FLCA-134, and Drilling Fluid M included 6 lb/bbl of the amphiphilic branched star polymer FLCA-134.

A Fann 35 rheometer was then used to measure the rheology of the fluid before and after hot rolling. The Roller Oven model 705ES, manufactured by Fann, was used for the hot rolling, which was conducted at 300° F. and atmospheric pressure for 16 hours.

As demonstrated in Table 12 in Drilling Fluids K, L and M, increasing the amount of FLCA-134 from 0 lb/bbl (Drilling Fluid K) to 2 lb/bbl (Drilling Fluid L) and finally to 6 lb/bbl (Drilling Fluid M) led to a drop in low shear dial readings (at 3 and 6 RPM) as well as gel strengths, particularly for hot rolled drilling fluids. It can be safely assumed that increasing the amount of FLCA-134 has an antagonistic effect with the functions of Sepiolite (an additive added to improve and increase the low shear dial readings). There is a fine tuning of the formulation that is needed when Sepiolite and FLCA-134 are added into the formulation. As shown in Tables 11 and 12, FLCA-134 with a loading of 2 lb/bbl is sufficient for fluid loss control The filter cake thickness was determined by conducting a fluid loss test with a Fann Low Pressure Low Temperature (LPLT) Filter Press Series 300 (350 mL). The fluid loss test was conducted at ambient temperature and a differential pressure of 100 psi for 30 minutes. The thickness of the filter cake was determined by using a pair of calipers.

Drilling fluid K exhibited a filter cake thickness of approximately 2/32", Drilling fluid L exhibited a filter cake thickness of approximately 1/32", and Drilling fluid M exhibited a filter cake thickness of approximately 5/32". As described in this disclosure, low fluid loss values are desirable to minimize the change in rheology of drilling fluids during drilling due to loss of fluids into the formation. In addition, a thin filter cake during drilling ensures that a variety of issues, such as stuck pipe, are avoided. Branched star polymer with smaller diameters, such as those within the nanoscale, are able to fill up the porosity of the filter cakes more efficiently than particles with larger diameters. This provides a filter cake with better sealing and reduces the loss of fluids into the formation. As the measurement for LPLT fluid loss is done in a static condition, where the mud is pressurized from the top in a LPLT cell, sufficient gel strength is needed to suspend solids and weighting materials. As the Fluid M has the lowest gel strength compared to

TABLE 12

Rheology data for drilling fluids K, L, and M at a temperature of 120° F.

| | Drilling fluid K (before hot rolling) | Drilling fluid K (after hot rolling) | Drilling fluid L (before hot rolling) | Drilling fluid L (after hot rolling) | Drilling fluid M (before hot rolling) | Drilling fluid M (after hot rolling) |
|---|---|---|---|---|---|---|
| 600 rpm | 185 | 120 | 218 | 214 | 223 | 200 |
| 300 rpm | 122 | 82 | 144 | 139 | 147 | 129 |
| 200 rpm | 94 | 69 | 112 | 107 | 116 | 100 |
| 100 rpm | 62 | 53 | 74 | 72 | 85 | 64 |
| 6 rpm | 14 | 30 | 21 | 20 | 38 | 12 |
| 3 rpm | 11 | 27 | 16 | 14 | 34 | 8 |
| 10 second gel strength, lbf/100 ft$^2$ | 11 | 29 | 16 | 13 | 32 | 8 |
| 10 minute gel strength, lbf/100 ft$^2$ | 11 | 53 | 32 | 37 | 48 | 13 |
| Apparent viscosity, cP | 93 | 60 | 109 | 107 | 112 | 100 |
| PV, cP | 63 | 38 | 74 | 75 | 76 | 71 |
| YP, lb/100 ft$^2$ | 59 | 44 | 70 | 64 | 71 | 58 |
| LPLT Fluid Loss, mL | 8.4 | | 5.5 | | 5.0 | |
| Filter Cake Thickness, inches | 2/32 | | 1/32 | | 5/32 | | fluids K and L, it is hardly surprising that the solids collapsed under pressure during LPLT measurements leading to thick filter cake.

The rheology data in Table 12 shows that increasing the amount of amphiphilic branched star polymer from 0 lb/bbl (Drilling fluid K) to 2 lb/bbl (Drilling fluid L) and finally to 6 lb/bbl (Drilling fluid M) led to a drop in low shear dial readings (at 6 and 3 rpm) as well as a decrease in gel strengths, particularly after hot rolling. Therefore, it was determined that increasing the amount of amphiphilic branched star polymer present in the drilling fluids had an antagonistic effect with the functions of the Sepiolite Pangel S9, available from Cary Company (which was added to improve and increase the low shear dial readings). The sepolite was added together with the formulation during mixing and aged/hot rolled at 300° F. for 16 hours. As Sepiolite is stable under high temperature (up to 400° F.), it is able to provide a stable low shear yield point unlike polymers that undergo thermal thinning or degrade at high temperatures. In addition, thermal thinning can also lead to loss of gel strengths, and therefore, loss of suspension capabilities of drill solids and weighting materials. Sepiolite is able to prevent this by maintaining a stable viscometer reading at 3 and 6 RPM.

Comparative water-based drilling fluids were then formulated as shown in Table 13 using conventional fluid loss control additives. Drilling fluids N and O included 2 lb/bbl and 1 lb/bbl FL-20, an acrylic polymer available from Fritz, as a fluid loss control additive, respectively. Drilling fluid P included 2 lb/bbl Therma-Chek®, available from Halliburton, as a fluid loss control additive. Drilling fluid Q included 2 lb/bbl FL-17, an acrylic polymer available from Fritz, as a fluid loss control additive. Drilling fluid R included 2 lb/bbl FL-29, an acrylic polymer available from Fritz, as a fluid loss control additive.

TABLE 13

Drilling fluid composition for drilling fluids N, O, P, Q, and R.

| Fluid Formulations (lb/bbl) | Drilling fluid N | Drilling fluid O | Drilling fluid P | Drilling fluid Q | Drilling fluid R |
| --- | --- | --- | --- | --- | --- |
| Water | 276.5 | 276.5 | 276.5 | 276.5 | 276.5 |
| MgO (pH buffer) | 4.5 | 4.5 | 4.5 | 4.5 | 4.5 |
| KCl | 8 | 8 | 8 | 8 | 8 |
| Aramco High Temperature Viscosifier | 3.25 | 3.25 | 3.25 | 3.25 | 3.25 |
| Barathin Plus | 3 | 3 | 3 | 3 | 3 |
| Barite | 311 | 311 | 311 | 311 | 311 |
| Sepiolite Pangel S9 - Cary Company | 4 | 4 | 4 | 4 | 4 |
| Conventional Fluid Loss Control Additive | 2 (FL-20) | 1 (FL-20) | 2 (Therma-Chek) | 2 (FL-17) | 2 (FL-29) |
| Density, lb/gal | 14 | 14 | 14 | 14 | 14 |
| Aging temp., ° F. | 300 | 300 | 300 | 300 | 300 |
| Aging conditions | rolling | rolling | rolling | rolling | rolling |
| Aging period, hr | 16 | 16 | 16 | 16 | 16 |
| pH before aging | 9.52 | 10 | 10 | 10 | 10 |
| pH after aging | 7.75 | 8 | 8 | 8 | 8 |

A Fann 35 rheometer was then used to measure the rheology of the fluid before and after hot rolling. The Roller Oven model 705ES, manufactured by Fann, was used for the hot rolling, which was conducted at 300° F. and atmospheric pressure for 16 hours. The rheology data is shown in Table 14. It is of note that the rheological characteristics of the drilling fluids before hot rolling are not as characteristic of field use of the drilling fluids, as initially mixing the drilling fluid components in a mixer does not allow for all the components to homogenize equally. Hot rolling is often needed as it allows for the formulation to mix and homogenize. Therefore, only fluids that are hot rolled are used for fluid loss testing. Although the rheological characteristics of the tested drilling fluids are provided for completeness, the measurements after hot rolling are most indicative of field performance.

TABLE 14

Rheology data for drilling fluids N, O, P, Q, and R at a temperature of 120° F.

| | Drilling fluid N (before hot rolling) | Drilling fluid N (after hot rolling) | Drilling fluid O (before hot rolling) | Drilling fluid O (after hot rolling) |
| --- | --- | --- | --- | --- |
| 600 rpm | 275 | 222 | 195 | 173 |
| 300 rpm | 188 | 154 | 125 | 113 |

TABLE 14-continued

Rheology data for drilling fluids N, O, P, Q, and R at a temperature of 120° F.

| | | | | |
|---|---|---|---|---|
| 200 rpm | 152 | 127 | 95 | 93 |
| 100 rpm | 105 | 94 | 62 | 68 |
| 6 rpm | 32 | 35 | 16 | 51 |
| 3 rpm | 29 | 28 | 12 | 45 |
| 10 second gel strength, lbf/100 ft$^2$ | 28 | 29 | 11 | 34 |
| 10 minute gel strength, lbf/100 ft$^2$ | 84 | 54 | 23 | 63 |
| Apparent viscosity, cP | 138 | 111 | 98 | 87 |
| PV, cP | 87 | 68 | 70 | 60 |
| YP, lb/100 ft$^2$ | 101 | 86 | 55 | 53 |
| LPLT Fluid Loss, mL | 5.4 | | 9.2 | |
| Filter Cake Thickness, inches | 2/32 | | 5/32 | |

| | Drilling fluid P (before hot rolling) | Drilling fluid P (after hot rolling) | Drilling fluid P (where 30 grams of water was added after hot rolling) | Drilling fluid Q (after hot rolling) | Drilling fluid Q (before hot rolling) | Drilling fluid R (after hot rolling) |
|---|---|---|---|---|---|---|
| 600 rpm | 218 | 229 | 154 | 215 | 266 | 180 |
| 300 rpm | 166 | 149 | 96 | 134 | 176 | 112 |
| 200 rpm | 103 | 117 | 71 | 99 | 144 | 82 |
| 100 rpm | 62 | 79 | 45 | 62 | 100 | 49 |
| 6 rpm | 11 | 21 | 9 | 13 | 39 | 7 |
| 3 rpm | 8 | 15 | 7 | 9 | 32 | 4 |
| 10 second gel strength, lbf/100 ft$^2$ | 8 | 19 | 6 | 10 | 36 | 5 |
| 10 minute gel strength, lbf/100 ft$^2$ | 23 | 64 | 15 | 16 | 90 | 11 |
| 30 minute gel strength lbf/100 ft$^2$ | | 79 | | | 122 | |
| Apparent viscosity, cP | 109 | 115 | 77 | 108 | 133 | 90 |
| PV, cP | 52 | 80 | 58 | 81 | 90 | 68 |
| YP, lb/100 ft$^2$ | 114 | 69 | 38 | 53 | 86 | 44 |
| LPLT Fluid Loss, mL | | 4.6 | | Gelling after rolling | | Solid gel formation after rolling |
| Filter Cake Thickness, inches | | 1/32" | | Gelling after rolling | | Solid gel formation after rolling |

30 grams of water was added to Drilling fluid P after hot rolling because Drilling fluid P was too thick given the 10 sec and 10 min gel strengths. In addition, an increase in gel strength was also seen after when a 30 min gel strength measurement was taken. The continuous build-up of gel strength led to the fluid to act like a thick paste. In order to improve the flowability and measure the fluid loss of a fluid and not a paste, additional water was added.

The filter cake thickness was determined by conducting a fluid loss test with a Fann Low Pressure Low Temperature (LPLT) Filter Press Series 300 (350 mL). The fluid loss test was conducted at a differential pressure of 100 psi for 30 minutes. The thickness of the filter cake was determined by using a pair of calipers.

Drilling fluid N exhibited a filter cake thickness of approximately 2/32", Drilling fluid O exhibited a filter cake thickness of approximately 5/32", Drilling fluid P exhibited a filter cake thickness of approximately 1/32", and the filter cake thickness of Drilling fluids Q and R could not be determined because Drilling fluid Q gelled after rolling, and Drilling fluid R exhibited solid gelling after rolling. It is noted that for equal concentration of fluid loss control additive added (2 lb/bbl), Drilling Fluid P (which included the conventional additive Therma-Chek) resulted in a final fluid that was too thick and difficult to be pumped downhole due to continuous buildup of gel, whereas Drilling fluid L (which included the amphiphilic branched star polymer FLCA-134) did not exhibit these issues of continuous gelling.

Drilling fluid N (which included FL-20 as a fluid loss control additive) provided similar fluid loss but a thicker filter cake when compared to Drilling fluid L (which included the amphiphilic branched star polymer). In addition, both before and after hot rolling, the 10-min gel strengths of Drilling fluid N were relatively higher than Drilling fluid L. In embodiments, a gel strength greater than 37, greater than 40, greater than 45, or greater than 50 lbf/100 ft$^2$ is not ideal as it will lead to high pump initiation pressure to break circulation after mud is in a static condition for a period of time. High pump pressure may result in formation fracture and lost circulation. Reducing FL-20 loading to 1 lb/bbl (Drilling fluid O) did not help reduce the gel strength, as shown in Drilling fluid O. In addition, reducing the loading of FL-20 to 1 lb/bbl (Drilling fluid 0, in comparison to Drilling fluid N, which had 2 lb/bbl) led to poor control of fluid loss, as the LPLT fluid loss was 9.2 mL (whereas Drilling fluid N exhibited 5.4 mL fluid loss), and the filter cake thickness increased to 5/32" (whereas Drilling fluid N had 2/32" filter cake thickness). A similar problem was observed in Drilling fluid Q, which included 2 lb/bbl of FL-17, where excessive gel strengths built up and prevented any reasonable measurement of LPLT fluid loss. FL-29 led to an extreme case of gelling where solid gel formed after hot rolling preventing rheology and fluid loss measurements. Drilling fluid P, which included 2 lb/bbl Therma-Chek, also led to high gel strengths but dilution after hot rolling led to fluid loss and filter cake thickness that is close to Drilling fluid L.

To determine the ability of the amphiphilic branched star polymer to provide fluid loss control without the addition of Sepiolite, as Sepiolite and the amphiphilic branched star polymer had an adverse combination shown in Drilling fluid M, water-based drilling fluids were formulated as shown in Table 15.

TABLE 15

Drilling fluid composition for drilling fluids S, T, and U.

| Fluid Formulations (lb/bbl) | Drilling fluid S | Drilling fluid T | Drilling fluid U |
|---|---|---|---|
| Water | 276.5 | 276.5 | 276.5 |
| MgO (pH buffer) | 4.5 | 4.5 | 4.5 |
| KCl | 8 | 8 | 8 |
| Aramco High Temperature Viscosifier | 3.25 | 3.25 | 3.25 |
| Barathin Plus | 3 | 3 | 3 |
| Barite | 311 | 311 | 311 |
| Amphiphilic Branched Star Polymer | — | 3 | 4 |
| Density, lb/gal | 14 | 14 | 14 |
| Aging temp., ° F. | 300 | 300 | 300 |
| Aging conditions | rolling | rolling | rolling |
| Aging period, hr | 16 | 16 | 16 |
| pH before aging | 11.4 | 9.58 | 9.5 |
| pH after aging | 8.5 | 8.2 | 8.3 |

Drilling Fluids S, T, and U had the same base drilling fluid composition, but Drilling Fluid S did not include the amphiphilic branched star polymer, Drilling Fluid T included 3 lb/bbl, and Drilling Fluid U included 4 lb/bbl of the amphiphilic branched star polymer.

A Fann 35 rheometer was then used to measure the rheology of the fluid before and after hot rolling. The Roller Oven model 705ES, manufactured by Fann, was used for the hot rolling, which was conducted at 300° F. and atmospheric pressure for 16 hours.

TABLE 12

Rheology data for drilling fluids S, T, and U at a temperature of 120° F.

| | Drilling fluid S (before hot rolling) | Drilling fluid S (after hot rolling) | Drilling fluid T (before hot rolling) | Drilling fluid T (after hot rolling) | Drilling fluid U (before hot rolling) | Drilling fluid U (after hot rolling) |
|---|---|---|---|---|---|---|
| 600 rpm | 153 | 107 | 183 | 154 | 190 | 185 |
| 300 rpm | 96 | 61 | 112 | 95 | 120 | 119 |
| 200 rpm | 72 | 45 | 84 | 72 | 92 | 89 |
| 100 rpm | 44 | 26 | 53 | 44 | 59 | 55 |
| 6 rpm | 6 | 4 | 17 | 7 | 18 | 9 |
| 3 rpm | 4 | 3 | 13 | 5 | 15 | 7 |
| 10 second gel strength, lbf/100 ft$^2$ | 4 | 4 | 11 | 5 | 12 | 6 |
| 10 minute gel strength, lbf/100 ft$^2$ | 12 | 7 | 24 | 10 | 28 | 13 |
| Apparent viscosity, cP | 77 | 54 | 92 | 77 | 95 | 93 |

TABLE 12-continued

Rheology data for drilling fluids S, T, and U at a temperature of 120° F.

| | Drilling fluid S (before hot rolling) | Drilling fluid S (after hot rolling) | Drilling fluid T (before hot rolling) | Drilling fluid T (after hot rolling) | Drilling fluid U (before hot rolling) | Drilling fluid U (after hot rolling) |
|---|---|---|---|---|---|---|
| PV, cP | 57 | 46 | 71 | 59 | 70 | 66 |
| YP, lb/100 ft$^2$ | 39 | 15 | 41 | 36 | 50 | 53 |
| LPLT Fluid Loss, mL | Settling - no measurement | | 4.6 | | 4.6 | |
| Filter Cake Thickness, inches | Settling - no measurement | | 1/32 | | 1/32 | |

It can been seen in Drilling fluid S that the absence of Sepiolite and the amphiphilic branched star polymer results in low shear rheology and low gel strengths. Additionally, settling in Drilling fluid S is seen with no fluid loss measurement or filter cake thickness measurement possible. When the amphiphilic branched star polymer is added in increasing amounts (in Drilling fluids T and U), improvements in the low shear rheology is seen with increased gel strengths. In addition, no settling is observed in either Drilling fluid T or Drilling fluid U, and both Drilling fluids T and U exhibited a fluid loss of 4.6 mL and a filter cake thickness of 1/32". In other words, the amphiphilic branched star polymer FLCA-134 not only provided fluid loss control but also acted to provide reduced fluid viscosity and increased gel strength. Most water soluble commercial fluid loss control additives, as seen in Table 13 and Table 14, led to water-based muds with high viscosities and even gelling. This is not ideal as the highly viscous fluids cannot be easily pumped downhole. Therefore, the drilling fluids including the amphiphilic branched star polymer of the present disclosure exhibits fluid loss control as well as improving pumpability as compared to drilling fluids including conventional fluid loss control additives.

The following description of the embodiments is exemplary and illustrative in nature and is in no way intended to be limiting in its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A amphiphilic branched star polymer comprising a desulfurized, crosslinked, polymerized reaction product of crosslinker C, hydrophobic monomer B, hydrophilic monomer A, wherein:
   the crosslinked polymerized reaction product comprises a plurality of block copolymer segments consisting of hydrophobic monomer B and hydrophilic monomer A interconnected via crosslinker C;
   the plurality of block copolymer segments do not comprise thiocarbonylthio groups; and
   monomer A is acrylic acid, monomer B is lauryl acrylate, and crosslinker C is N,N-methylene bis(acrylamide).

2. The amphiphilic branched star polymer of claim 1, having a number averaged molecular weight of greater than 3000 g/mol.

3. The amphiphilic branched star polymer of claim 1, in which:
   the branched star polymer comprises 0.01 to 20 wt. % of monomer A;
   the branched star polymer comprises 60 to 99 wt. % of monomer B; and
   the branched star polymer comprises 0.01 to 35 wt. % of the crosslinker C.

4. The amphiphilic branched star polymer of claim 1, in which:
   the branched star polymer comprises from 50 to 65 wt. % of monomer A;
   the branched star polymer comprises from 1 to 25 wt. % of monomer B; and
   the branched star polymer comprises from 1 to 20 wt. % of the crosslinker C.

5. A hydrophilic branched star polymer comprising a desulfurized, crosslinked, polymerized reaction product of crosslinker C, hydrophilic monomer A, hydrophilic monomer B, and hydrophilic monomer D, wherein the crosslinked polymerized reaction product comprises:

a plurality of block copolymer segments consisting of hydrophilic monomer A, hydrophilic monomer B, and hydrophilic monomer D interconnected via crosslinker C, and in which the plurality of block copolymer segments do not comprise thiocarbonylthio groups, and monomer A is acrylic acid, monomer B is N,N-dimethylacrylamide, monomer D is 2-acrylamido-2-methylpropane sulfonic acid, and crosslinker C is N,N-methylene bis(acrylamide).

6. The branched star polymer of claim 5, in which the branched star polymer has a molecular weight of greater than 3000 g/mol.

7. The amphiphilic branched star polymer of claim 1, in which the amphiphilic branched start polymer further comprises the crosslinked, polymerized reaction of a hydrophilic monomer D, and in which the crosslinked polymerized reaction product comprises a plurality of block copolymer segments of the hydrophobic monomer B, the hydrophilic monomer A, and the hydrophilic monomer D interconnected via the crosslinker C.

8. The branched star polymer of claim 5, comprising: from 5 to 55 wt. % of monomer A; from 15 to 50 wt. % of monomer B; from 15 to 30 wt. % of crosslinker C; and from 15 to 50 wt. % of monomer D.

\* \* \* \* \*